US011556826B2

(12) United States Patent
Bui et al.

(10) Patent No.: US 11,556,826 B2
(45) Date of Patent: Jan. 17, 2023

(54) GENERATING HYPER-PARAMETERS FOR MACHINE LEARNING MODELS USING MODIFIED BAYESIAN OPTIMIZATION BASED ON ACCURACY AND TRAINING EFFICIENCY

(71) Applicant: Adobe Inc., San Jose, CA (US)

(72) Inventors: Trung Bui, San Jose, CA (US); Lidan Wang, San Jose, CA (US); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 412 days.

(21) Appl. No.: 16/825,531

(22) Filed: Mar. 20, 2020

(65) Prior Publication Data

US 2021/0295191 A1 Sep. 23, 2021

(51) Int. Cl.
| *G06N 7/00* | (2006.01) |
| *G06N 20/20* | (2019.01) |
| *G06N 20/10* | (2019.01) |
| *G06K 9/62* | (2022.01) |
| *G06N 3/08* | (2006.01) |
| *G06V 10/75* | (2022.01) |

(52) U.S. Cl.
CPC ........... *G06N 7/005* (2013.01); *G06K 9/6228* (2013.01); *G06K 9/6262* (2013.01); *G06K 9/6289* (2013.01); *G06N 3/084* (2013.01); *G06N 20/10* (2019.01); *G06N 20/20* (2019.01); *G06V 10/751* (2022.01)

(58) Field of Classification Search
CPC ........ G06N 7/005; G06N 20/20; G06N 20/10; G06N 3/084; G06V 10/751; G06K 9/6228; G06K 9/6262; G06K 9/6289
See application file for complete search history.

(56) References Cited

U.S. PATENT DOCUMENTS

| 11,227,047 B1* | 1/2022 | Vashisht | G06F 21/552 |
| 2018/0225516 A1* | 8/2018 | Serre | G06V 10/454 |
| 2019/0304090 A1* | 10/2019 | Wang | G06K 9/6273 |
| 2020/0125961 A1* | 4/2020 | Agrawal | G06N 5/003 |

(Continued)

OTHER PUBLICATIONS

A. Klein, S. Falkner, S. Bartels, P. Hennig, and F. Hutter. Fast Bayesian Optimization of Machine Learning Hyper-parameters on Large Datasets. AISTATS: Proceedings of the 20th International Conference on Artificial Intelligence and Statistics, 2017.

(Continued)

*Primary Examiner* — Utpal D Shah
(74) *Attorney, Agent, or Firm* — Keller Preece PLLC

(57) ABSTRACT

The present disclosure relates to systems, methods, and non-transitory computer readable media for selecting hyper-parameter sets by utilizing a modified Bayesian optimization approach based on a combination of accuracy and training efficiency metrics of a machine learning model. For example, the disclosed systems can fit accuracy regression and efficiency regression models to observed metrics associated with hyper-parameter sets of a machine learning model. The disclosed systems can also implement a trade-off acquisition function that implements an accuracy-training efficiency balance metric to explore the hyper-parameter feature space and select hyper-parameters for training the machine learning model considering a balance between accuracy and training efficiency.

20 Claims, 14 Drawing Sheets

(56) References Cited

U.S. PATENT DOCUMENTS

| | | | | |
|---|---|---|---|---|
| 2020/0242400 | A1* | 7/2020 | Perkins | G06K 9/6262 |
| 2020/0265303 | A1* | 8/2020 | Osogami | G06Q 10/04 |
| 2020/0302234 | A1* | 9/2020 | Walters | G06N 7/005 |
| 2020/0320428 | A1* | 10/2020 | Chaloulos | G06N 20/00 |
| 2021/0035026 | A1* | 2/2021 | Bansal | H04L 41/064 |
| 2021/0056378 | A1* | 2/2021 | Yang | G06N 3/063 |

OTHER PUBLICATIONS

J. Snoek, O. Rippel, K. Swersky, R. Kiros, N. Satish, N. Sundanram, M. Patwary, and R. Adams. Scalable Bayesian Optimization Using Deep Neural Networks. Proceedings of the 32nd International Conference on Machine Learning, 2015.

T. Domhan, J. Springenberg, and F. Hutter. Speeding up automatic hyperparameter optimization of deep neural networks by extrapolation of learning curves. IJCAI: Proceedings of the 24th International Conference on Artificial Intelligence, 2015.

D. Beck, A. Gispert, G. Iglesias, A. Waite, and B. Byrne. Speed-Constrained Tuning for Statistical Machine Translation Using Bayesian Optimization. Proceedings of NAACL-HLT 2016.

J. Hernandez-Lobato, M. Gelbart, M. Hoffman, R. Adams, and Z. Ghahramani. Predictive Entropy Search for Bayesian Optimization with Unknown Constraints. Proceedings of the 32nd International Conference on Machine Learning, 2015.

B. Letham, B. Karrer, G. Ottoni, and E. Bakshy. Constrained Bayesian Optimization with Noisy Experiments. Bayesian Analysis, vol. 14, No. 2, 2019.

P. Neculoiu, M. Versteegh, and M. Rotaru. Learning Text Similarity with Siamese Recurrent Networks. Proceedings of the Workshop on Representation Learning for NLP, 2016.

R. Bardenet, M. Brendel, B. Kegls, and M. Sebag. Collaborative hyperparameter tuning. ICML: Proceedings of the 30th International Conference on Machine Learning, 2013.

M. Feurer, J. Springenberg, and F. Hutter. Initializing Bayesian Hyperparameter Optimization via Meta-Learning. AAAI: Twenty-ninth AAAI Conference, 2015.

Y. Bengio, A. Courville, and P. Vincent. Representation Learning: A Review and New Perspectives. Pattern Analysis and Machine Intelligence, vol. 35, Issue: 8, 2013.

J. Bergstra, and Y. Bengio. Random search for hyper-parameter optimization. The Journal of Machine Learning Research, vol. 13 Issue 1, 2012.

E. Brochu, V. Cora, and N. Freitas. A Tutorial on Bayesian Optimization of Expensive Cost Functions, with Application to Active User Modeling and Hierarchical Reinforcement Learning. arXiv:1012.2599v1, Dec. 12, 2010.

K. Eggensperger, F. Hutter, H. Hoos, and K. Leyton-Brown. Surrogate Benchmarks for Hyperparameter Optimization. Meta-Learning and Algorithm Selection Workshop, 2014.

K. Eggensperger, F. Hutter, H. Hoos, and K. Leyton-Brown. Efficient Benchmarking of Hyperparameter Optimizers via Surrogates. AAAI: Twenty-ninth AAAI Conference, 2015.

J. Snoek, H. Larochelle, and R. Adams. Practical Bayesian Optimization of Machine Learning Algorithms. NIPS: Advances in Neural Information Processing Systems, 2014.

K. Swersky, J. Snoek, and R. Adams. Multi-Task Bayesian Optimization. NIPS: Advances in Neural Information Processing Systems, 2013.

J. Bergstra, R. Bardenet, Y. Bengio, and B. Kegl. Algorithms for Hyper-Parameter Optimization. NIPS: Advances in Neural Information Processing Systems, 2011.

H. Jin, Q. Song, and X. Hu. Auto-Keras: An Efficient Neural Architecture Search System. KDD: 25th ACM SIGKDD Conference on Knowledge Discovery and Data Mining, 2019.

F. Hutter, H. Hoos, and K. Leyton-Brown. Sequential Model-Based Optimization for General Algorithm Configuration. LION4, 2011.

F. Hutter, H. Hoos, and K. Leyton-brown. An Efficient Approach for Assessing Hyperparameter Importance. ICML 2014: Proceedings of the 31st International Conference on Machine Learning.

B. Komer, J. Bergstra, and C. Eliasmith. Hyperopt-Sklearn: Automatic Hyperparameter Configuration for Scikit-Learn. CIPY 2014: Proceedings of the 13th Python In Science Conference.

C. Manning, P. Raghavan, and H. Schutze. Introduction to Information Retrieval. Cambridge University Press, 2008.

C. Thornton, F. Hutter, H. Hoos, and K. Leyton-Brown. Auto-WEKA: combined selection and hyperparameter optimization of classification algorithms. KDD: Proceedings of the 19th ACM SIGKDD international conference on Knowledge discovery and data mining, 2013.

E. Voorhees. The TREC question answering track. Natural Language Engineering, 2005.

Yelp Academic Challenge Dataset, http://www.yelp.com/dataset_challenge; Date downloaded Mar. 31, 2020.

D. Yogatama, and G. Mann. Efficient Transfer Learning Method for Automatic Hyperparameter Tuning. AISTATS: International Conference on Artificial Intelligence and Statistics, 2014.

A. Zheng, and M. Bilenkoh. Lazy Paired Hyper-Parameter Tuning. IJCAI: Twenty-third International Joint Conference on Artificial Intelligence, 2013.

L. Wang, M. Feng, B. Zhou, B. Xiang, and S. Mahadevan. Efficient Hyper-parameter Optimization for NLP Applications. Proceedings of the 2015 Conference on Empirical Methods in Natural Language Processing, 2015.

R. Fan, K. Chang, C. Hsieh, X. Wang, and C. Lin. LIBLINEAR: A Library for Large Linear Classification. Journal of Machine Learning Research: 2008, 1871-1874.

G. Montavon, G. Orr, and K. Muller. Neural Networks: Tricks of the Trade, Second Edition. LNCS. Springer, 2012.

* cited by examiner

|  | Insurance (accuracy) | Reviews (Accuracy) |
|---|---|---|
| Bayes opt on full data | 0.54 | 0.84 |
| Bayes opt on small subset | 0.38 | 0.78 |
| Hyper-Parameter Determination System | 0.51 | 0.81 |

Fig. 10A

|  | Insurance (min) | Reviews (min) |
|---|---|---|
| Bayes opt on full data | 12 | 4.0 |
| Bayes opt on small subset | 5.2 | 1.9 |
| Hyper-Parameter Determination System | 6.7 | 2.3 |

Fig. 10B

GENERATING HYPER-PARAMETERS FOR MACHINE LEARNING MODELS USING MODIFIED BAYESIAN OPTIMIZATION BASED ON ACCURACY AND TRAINING EFFICIENCY

BACKGROUND

In the field of machine learning, the performance of many machine learning models such as support vector machines or neural networks depends on their hyper-parameters. For example, the prediction accuracy of support vector machines depends on a kernel hyper-parameter (y) and a regularization hyper-parameter (C). Similarly, deep neural networks are sensitive to a wide range of hyper-parameters including the number of units per layer, learning rates, weight decay, and dropout rates. In many cases, hyper-parameter settings make the difference between mediocre and state-of-the-art performance. Motivated by improving such performance, researchers have invested time and energy into determining hyper-parameters, and optimization systems have emerged as a successful tool for hyper-parameter selection through an iterative sequential process.

Despite these advances however, conventional hyper-parameter selection systems continue to suffer from a number of disadvantages in efficiency and flexibility. For example, many conventional hyper-parameter selection systems are singularly focused on hyper-parameter selection for accuracy. Indeed, many conventional systems select hyper-parameters based only on a consideration of the resulting accuracy of a model implementing those hyper-parameters. To obtain high degrees of accuracy sought for many applications, these conventional systems require an excessive amount of computing resources such as processing power, processing time, and memory to train neural networks or other machine learning models that are based on accuracy-specific hyper-parameters.

Beyond being inefficient, many conventional hyper-parameter selection systems are also inflexible. As mentioned, conventional systems are often rigidly fixed to selecting hyper-parameters for the accuracy of the resulting model. Indeed, because the singular focus of conventional systems, these systems cannot flexibly adapt to accommodate different considerations for selecting hyper-parameters and training machine learning models.

Thus, there are several disadvantages with regard to conventional hyper-parameter selection systems.

SUMMARY

One or more embodiments described herein provide benefits and solve one or more of the foregoing or other problems in the art with systems, methods, and non-transitory computer readable media that can generate hyper-parameters for machine learning models by utilizing modified Bayesian optimization to select hyper-parameters based on a combination of accuracy and efficiency metrics. In particular, the disclosed systems can utilize a unified Bayesian optimization framework for jointly optimizing models for both prediction accuracy (i.e., effectiveness) and training efficiency. More specifically, the disclosed systems can utilize an objective function that reflects both an accuracy acquisition function and an efficiency acquisition function to model the tradeoff between accuracy and training efficiency within a hyper-parameter search space. The disclosed systems can also apply a principled Bayesian optimization framework to select hyper-parameters based on the tradeoff.

The disclosed systems can further account for extrinsic hyper-parameters such as training set size within the hyper-parameter space. In this manner, the disclosed systems can select hyper-parameters for machine learning models that improve model accuracy and training efficiency.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 10A-10B illustrate tables of experimental results reflecting improvements in efficiency and flexibility of the hyper-parameter determination system in accordance with one or more embodiments;

DETAILED DESCRIPTION

Figure 1:
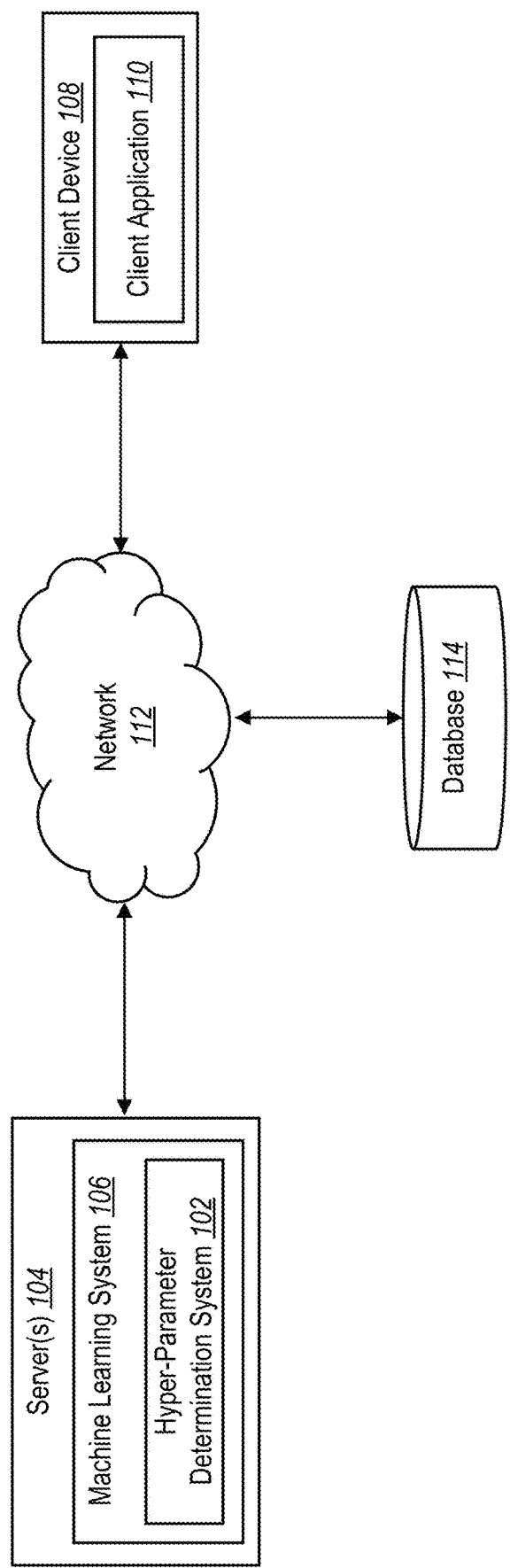
FIG. 1 illustrates an example system environment for implementing a hyper-parameter determination system in accordance with one or more embodiments.

One or more embodiments described herein include a hyper-parameter determination system that can select hyper-parameters for machine learning models utilizing modified Bayesian optimization reflecting both accuracy and training efficiency metrics. In particular, the hyper-parameter determination system can utilize a Bayesian optimization technique that considers both accuracy of a machine learning model trained using hyper-parameters as well as training efficiency of the machine learning model. To achieve this balance, the disclosed systems can utilize an objective function to weight training efficiency relative to accuracy in accordance with an accuracy-training efficiency balance metric. For example, the disclosed systems can fit an accuracy regression model to pairs of observed hyper-parameter sets and associated observed accuracy metrics. Similarly, the disclosed systems can fit an efficiency regression model to pairs of observed hyper-parameter sets ad associated observed training efficiency metrics. Utilizing the accuracy regression model and the efficiency regression model, the disclosed systems can further determine a trade-off acquisition function to balance consideration for accuracy and training efficiency in selecting hyper-parameters from a hyper-parameter space.

As mentioned, the hyper-parameter determination system can fit an accuracy regression model to pairs of observed hyper-parameter sets and associated accuracy metrics. In particular, the hyper-parameter determination system can identify accuracy metrics associated with particular hyper-parameter sets by observing historical machine learning model performance. For example, the hyper-parameter system can apply a hyper-parameter set in training a machine learning model and observe corresponding accuracy metrics (e.g., loss measures, error rates, confidence values, etc.). Thus, the hyper-parameter determination system can identify observed hyper-parameter sets for a machine learning architecture (e.g., a model architecture) that includes tunable parameters.

Based on identifying accuracy metrics for observed hyper-parameter sets, the hyper-parameter determination system can further fit an accuracy regression model to the accuracy metrics and the observed hyper-parameter sets. More specifically, the hyper-parameter determination system can group the accuracy metrics and the observed hyper-parameter sets into pairs (e.g., where a pair includes an observed hyper-parameter set and a corresponding accuracy metric) and fit the accuracy regression model to the pairs. In some embodiments, the accuracy regression model reflects probabilities of hyper-parameter sets corresponding to particular accuracies.

Similarly, the hyper-parameter determination system can fit an efficiency regression model to pairs of observed hyper-parameter sets and associated training efficiency metrics. Particularly, the hyper-parameter determination system can observe historical performance of machine learning models and determine training efficiency metrics (e.g., training time, iterations, processing resources, etc.) corresponding to particular hyper-parameter sets. Thus, the hyper-parameter determination system can determine pairs of hyper-parameter sets and corresponding training efficiency metrics, and the hyper-parameter determination system can fit an efficiency regression model to the pairs. In one or more embodiments, the efficiency regression model reflects probabilities of hyper-parameter sets corresponding to particular training efficiencies.

Utilizing the accuracy regression model and the training efficiency regression model, the hyper-parameter determination system can select hyper-parameters based on a trade-off or a balance between accuracy and training efficiency. To elaborate, the hyper-parameter determination system can identify or determine an accuracy acquisition function utilizing the accuracy regression model, and the hyper-parameter determination system can identify or determine an efficiency acquisition function utilizing the efficiency regression model. The hyper-parameter determination system can further utilize a trade-off acquisition function to weight the accuracy acquisition function relative to the training efficiency acquisition function in accordance with an accuracy-training efficiency balance metric.

Thus, by utilizing the trade-off acquisition function, the hyper-parameter determination system can generate a new hyper-parameter set. More, specifically, the hyper-parameter determination system can utilize the trade-off acquisition function to select a hyperparameter set from a hyper-parameter space modeled after performance of historically observed hyper-parameter sets. Indeed, the hyper-parameter determination system can select hyper-parameters from the hyper-parameter space based on how the hyper-parameters affect accuracy and training efficiency of a machine learning model trained based on the hyper-parameters.

In addition, the hyper-parameter determination system can learn tunable parameters for a machine learning architecture of a machine learning model based on the generated hyper-parameter set. Indeed, the hyper-parameter determination system can train the machine learning model utilizing the hyper-parameter set to learn the tunable parameters. In addition to training the machine learning model, the hyper-parameter determination system can also determine new accuracy metrics and new training efficiency metrics that result from the generated hyper-parameter set. The hyper-parameter determination system can also modify the accuracy regression model and the training efficiency regression model to fit the new accuracy metrics and the new training efficiency metrics, respectively. Indeed, the hyper-parameter determination system can utilize an iterative process to repeatedly generate hyper-parameter sets based on a trade-off acquisition function by training (or re-training) a machine learning model using generated hyper-parameter sets, determining updated accuracy metrics and updated training efficiency metrics, modifying the respective regression models to fit the updated metrics, and modifying the trade-off acquisition function based on the modified regression models.

In some embodiments, the hyper-parameter determination system flexibly utilizes different accuracy-training efficiency balance metrics. In particular, the hyper-parameter determination system can identify, receive, or determine an accuracy-training efficiency balance metric to utilize as part of a trade-off acquisition metric. The hyper-parameter determination system can further generate different hyper-parameter sets utilizing different trade-off acquisition metrics that utilize different accuracy-training efficiency balance metrics. In addition, the hyper-parameter determination system can compare accuracy metrics and training efficiency metrics of machine learning models trained utilizing the different hyper-parameter sets to select an accuracy-training efficiency balance metric. For instance, the hyper-parameter determination system can select an accuracy-training efficiency balance metric that results both in accuracy metrics that satisfy a threshold accuracy and training efficiency metrics that satisfy a threshold training efficiency.

The hyper-parameter determination system can provide several advantages over conventional hyper-parameter selection systems. For example, the hyper-parameter determination system is more efficient than conventional systems. In particular, the hyper-parameter determination system utilizes fewer computer resources such as memory, computing time, and processing power in training machine learning models. As opposed to conventional systems that focus on accuracy of a model trained using particular hyper-parameters, the hyper-parameter determination system can utilize an accuracy-training efficiency balance metric as part of a trade-off acquisition function to generate hyper-parameters for training a machine learning model. As a result, the hyper-parameter determination system can more efficiently (e.g., more quickly and with fewer computer resources) train a machine learning model that also retains a high degree of accuracy.

In addition, the hyper-parameter determination system can improve flexibility over conventional hyper-parameter selection systems. For example, the hyper-parameter determination system can consider multiple factors at once when generating hyper-parameters for training a machine learning model Indeed, the hyper-parameter determination system can utilize a flexible, adjustable accuracy-training efficiency balance metric to model tradeoff between accuracy and efficiency based on particular machine learning models, projects, or client needs. Accordingly, the hyper-parameter determination system can flexibly balance accuracy and training efficiency when selecting hyper-parameters and training machine learning models.

As a further example, the hyper-parameter determination system can improve flexibility for a wider range of real-world applications than many conventional hyper-parameter selection systems. As a result of their accuracy-focused hyper-parameter selection, many conventional systems may not meet the strict real-world efficiency requirements necessary to deploy in a production environment. In addition, many conventional systems focus on optimizing hyper-parameter determination system of a given model class, while ignoring other important extrinsic hyper-parameters (e.g., training set size). The hyper-parameter determination system, on the other hand, can account for extrinsic hyper-parameters within an enriched hyper-parameter space and also improve efficiency over conventional systems for better deployment in real-world applications. Indeed, due at least in part to its improved efficiency, the hyper-parameter determination system can meet the real-world efficiency requirements of many production environments.

As illustrated by the foregoing discussion, the present disclosure utilizes a variety of terms to describe features and benefits of the hyper-parameter determination system. Additional detail is hereafter provided regarding the meaning of these terms as used in this disclosure. In particular, the term "machine learning model" refers to a model of one or more algorithms that can be tuned (e.g., trained) based on inputs to approximate unknown functions. A machine learning model can have a particular "machine learning architecture" that refers to the constituent components of the machine learning model. For example, a machine learning model can include branches of a decision tree, neurons and layers of a neural network, or other constituent analytical components of a machine learning model. A machine learning model/architecture can also include "tunable parameters" such as internal weights and relationships that are specific to the type of model/architecture and that are learned via training or tuning the model/architecture. Example machine learning models/architectures include, but are not limited to, support vector machines ("SVMs"), random forest algorithms, decision trees, autoencoders, and neural networks (e.g., convolutional neural networks, recurrent neural networks, generative adversarial neural networks, or graph neural networks). For example, a machine learning model can refer to a neural network that includes an algorithm (or a set of algorithms) that implements deep learning techniques to model high-level abstractions in data. In particular, a neural network can include a model of interconnected artificial neurons (e.g., organized in layers) that communicate and learn to approximate complex functions and generate outputs based on a plurality of inputs provided to the model.

Relatedly, the term "train" (or its variations such as "trained" or "training") refers to utilizing information to tune or teach a machine learning model (e.g., a neural network) by, for example, testing inputs and adjusting one or more weights or parameters of the machine learning model to modify (e.g., improve) generated outputs.

As mentioned above, the hyper-parameter determination system can fit an accuracy regression model to observed hyper-parameter sets and associated accuracy metrics. As also mentioned, the hyper-parameter determination system can fit an efficiency regression model to observed hyper-parameter sets and associated training efficiency metrics. As used herein, the term "regression model" refers to a function or a set of functions for estimating or determining relationships between data (e.g., between dependent and independent variables). A regression model can represent or reflect probabilities of values for one variable corresponding to values for another variable. For example, an "accuracy regression model" can include probability distributions reflecting probabilities of various hyper-parameter sets corresponding to (e.g., resulting in) different accuracies. Similarly, an "efficiency regression model" can include probability distributions reflecting probabilities of various hyper-parameter sets corresponding to (e.g., resulting in) different training efficiencies.

Relatedly, the term "accuracy metrics" refers to one or more measures of error or accuracy associated with a machine learning model. In particular, accuracy metrics can include percentages or proportions of a machine learning model predicting an output or result correctly. Similarly, accuracy metrics can include a measure of error or distance between a predicted output and a ground truth. For example, accuracy metrics can include a measure of loss (e.g., from a loss function), an error level, a confidence level, or another measure of a machine learning model correctly generating a predicted output based on particular hyper-parameter set. To illustrate, with regard to classification machine learning models, an accuracy metric can include a difference (or a percentage or rate of difference) between a predicted classification and a ground truth classification. In some embodiments, the hyper-parameter determination system determines accuracy metrics and normalizes the metrics into the range [0,1] for use as an optimization metric. Example accuracy metrics include prediction accuracy, precision, and recall.

Along similar lines, the term "training efficiency metrics" refers to one or more measures of training efficiency or inefficiency associated with a machine learning model. For example, training efficiency metrics can include indications of how quickly a machine learning model is trained based on a particular hyper-parameter set (e.g., a training speed). Indeed, training efficiency metrics can indicate an amount or a duration of time associated with training a machine learning model. Similarly, training efficiency metrics can include computer resources (e.g., memory, processing power, storage, or bandwidth) associated with training a machine learning model. In some embodiments, the hyper-parameter determination system can determine training efficiency metrics and normalize them into the range of [0,1] for use as an optimization metric.

In addition, the term "hyper-parameter" refers to a parameter associated with a machine learning model and whose value is set prior to (or independently of) training the machine learning model. For example, a hyper-parameter can comprise a parameter that is pre-defined (and does not vary from the pre-defined setting) as a machine learning model is trained. Thus, a hyper-parameter can include a parameter that defines one or more aspects of how a machine learning model processes data to generate an output. Example hyper-parameters include a training set size, a dropout rate, a regularization parameter, a hidden unit, a batch size, a number of epochs, a bias, or a cost parameter for training a machine learning model.

Thus, a hyper-parameter set refers to a set of one or more hyper-parameters. Further, the term "observed" is a modifier referring to data relating to a measurement or a determination obtained by monitoring or observing performance of machine learning model. Thus, an "observed hyperparameter set" refers to a set of one or more hyper-parameters that is used to determine observed accuracy metrics and/or observed training efficiency metrics by monitoring or observing performance of a machine learning model trained using the observed hyper-parameter set.

As mentioned above, the hyper-parameter determination system can generate a hyper-parameter set by utilizing a trade-off acquisition function that includes an accuracy-training efficiency balance metric. As used herein, the term "acquisition function" refers to a Bayesian optimization technique for determining a particular (e.g., subsequent) data point based on a posterior distribution over an objective function. For example, an acquisition function can include a function that predicts or identifies a candidate value with an expected improvement (e.g., over a current selection or state). An "accuracy acquisition function" refers to an acquisition function that determines a hyper-parameter set with expected improvement in accuracy (e.g., over a current accuracy). Also, an "efficiency acquisition function" refers to an acquisition function that determines a hyper-parameter set with expected improvement in training efficiency (e.g., over a current training efficiency). Further, a "trade-off acquisition function" refers to an acquisition function that determines a hyper-parameter set with expected improvement of a weighted combination of accuracy and training efficiency (e.g., in accordance with an objective function).

Additionally, the term "accuracy-training efficiency balance metric" refers to a metric or a parameter that weights accuracy relative to training efficiency (or vice-versa). For example, the hyper-parameter determination system can utilize an accuracy-training efficiency balance metric to weight accuracy acquisition functions and training efficiency acquisition functions for selecting hyper-parameters. In some embodiments, an accuracy-training efficiency balance metric is a modifiable trade-off parameter that balances between accuracy and training efficiency.

Additional detail regarding the hyper-parameter determination system will now be provided with reference to the figures. For example, FIG. 1 illustrates a schematic diagram of an example system environment for implementing a hyper-parameter determination system 102 in accordance with one or more embodiments. An overview of the hyper-parameter determination system 102 is described in relation to FIG. 1. Thereafter, a more detailed description of the components and processes of the hyper-parameter determination system 102 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIG. 13.

As mentioned, the environment includes a client device 108. The client device 108 can be one of a variety of computing devices, including a smartphone, a tablet, a smart television, a desktop computer, a laptop computer, a virtual reality device, an augmented reality device, or another computing device as described in relation to FIG. 13. Although FIG. 1 illustrates a single client device 108, in some embodiments the environment can include multiple different client devices, each associated with a different user. The client device 108 can communicate with the server(s) 104 via the network 112. For example, the client device 108 can receive user input from a user interacting with the client device 108 (e.g., via the client application 110) to, for example, set a value for an accuracy-training efficiency balance metric, request to train a machine learning model using a trade-off acquisition function, and/or apply a machine learning model to a particular task (e.g., digital image classification or natural language processing). Thus, the hyper-parameter determination system 102 on the server(s) 104 can receive information or instructions to generate a hyper-parameter set utilizing a trade-off acquisition function and/or to train a machine learning model utilizing a generated hyper-parameter set based on the input received by the client device 108.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including a user interface for selecting values for accuracy-training efficiency balance metrics, generating hyper-parameter sets, training machine learning models, and/or applying machine learning models. Additionally, the client application 110 can present information in the form of a trained machine learning model and/or resultant accuracy metrics and/or training efficiency metrics. A user can interact with the client application 110 to provide user input to perform an operation as mentioned above.

As illustrated in FIG. 1, the environment includes the server(s) 104. The server(s) 104 may generate, track, store, process, receive, and transmit electronic data, such as queries and query results. For example, the server(s) 104 may receive data from the client device 108 in the form of a training request. In addition, the server(s) 104 can transmit data to the client device 108 to provide access to a machine learning model trained utilizing a trade-off acquisition function. Indeed, the server(s) 104 can communicate with the client device 108 to transmit and/or receive data via the network 112. In some embodiments, the server(s) 104 comprises a distributed server where the server(s) 104 includes a number of server devices distributed across the network 112 and located in different physical locations. The server(s) 104 can comprise a content server, an application server, a communication server, a web-hosting server, or a machine learning server.

As shown in FIG. 1, the server(s) 104 can also include the hyper-parameter determination system 102 as part of a machine learning system 106. The machine learning system 106 can communicate with the client device 108 to perform various functions associated with the client application 110 such as classifying digital content items, performing edits to digital content, and identifying elements of natural language. In addition, the machine learning system 106 and/or the hyper-parameter determination system 102 can access a repository of machine learning models and stored hyper-parameters (e.g., stored within the database 114) to generate hyper-parameter sets for training the machine learning models.

Although FIG. 1 depicts the hyper-parameter determination system 102 located on the server(s) 104, in some embodiments, the hyper-parameter determination system 102 may be implemented by (e.g., located entirely or in part) on one or more other components of the environment. For example, the hyper-parameter determination system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the hyper-parameter determination system 102, bypassing the network 112. In addition, the database 114 can be located external to the server(s) 104 (e.g., in communication via the network 112) or located on the server(s) 104 and/or on the client device 108. Additionally, the environment can include one or machine learning models as part of the hyper-parameter determination system 102, stored within the database 114, included as part of the client application 110, or housed on the server(s) 104.

Figure 2:
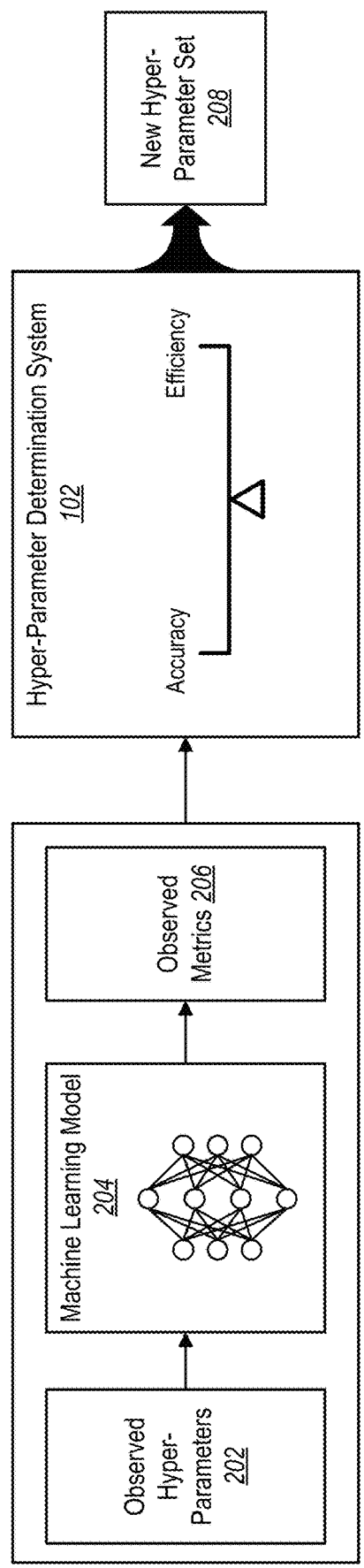
FIG. 2 illustrates generating a hyper-parameter set utilizing the hyper-parameter determination system in accordance with one or more embodiments.

As mentioned, the hyper-parameter determination system 102 can utilize a modified Bayesian optimization framework to jointly select hyper-parameters for prediction accuracy and training efficiency. In particular, the hyper-parameter determination system 102 can identify observed accuracy metrics and observed training efficiency metrics of a machine learning model trained using an observed hyper-parameter set to determine how to improve the training efficiency metrics and/or the accuracy metrics. FIG. 2 illustrates a high-level diagram for generating a hyper-parameter set based on a balance between accuracy and training efficiency in accordance with one or more embodiments.

As illustrated in FIG. 2, the hyper-parameter determination system 102 identifies observed hyper-parameters 202. For example, the hyper-parameter determination system 102 identifies hyper-parameters associated with one or more machine learning models. In some embodiments, the hyper-parameter determination system 102 identifies the observed hyper-parameters 202 in groups or sets (e.g., observed hyper-parameter sets).

In addition, the hyper-parameter determination system 102 processes the observed hyper-parameters 202 utilizing a machine learning model 204. Upon analyzing the hyper-parameters 202, the machine learning model 204 generates outputs. Indeed, the hyper-parameter determination system 102 trains the machine learning model 204 utilizing the observed hyper-parameter 202 and utilizes the machine learning model 204 to generate outputs in the form of predicted results. The predicted results can vary depending on the purpose of the machine learning model (e.g., a digital classification model can predict classifications for digital image, whereas a natural language response model can generate a predicted natural language response).

The machine learning model 204 can include a particular machine learning architecture. For example, the machine learning model 204 can include a neural network having a neural network architecture that includes a plurality of interconnected layers (e.g., convolutional layers, pooling layers, etc.). The machine learning model 204 can pass latent feature vectors between the layers to generate predicted outputs. Moreover, the layers of the neural network architecture can include tunable parameters that can be learned (or trained) to approximate unknown functions.

The hyper-parameter determination system 102 further determines observed metrics 206 based on the training. To elaborate, the hyper-parameter determination system 102 identifies, receives, or collects observed metrics 206 such as accuracy metrics and training efficiency metrics for the machine learning model 204. For the accuracy metrics, the hyper-parameter determination system 102 monitors performance of the machine learning model 204 to determine how accurately the machine learning model 204 generates an output (e.g., a prediction).

For the training efficiency metrics, the hyper-parameter determination system 102 monitors training of the machine learning model 204 to determine a measure of efficiency. For example, in some embodiments, the hyper-parameter determination system 102 determines how long it takes to train the machine learning model 204. More specifically, the hyper-parameter determination system 102 monitors performance of the machine learning model 204 to determine when the machine learning model 204 performs a task with at least a threshold level of accuracy (e.g., where an error or a measure of loss associated with the machine learning model 204 is below a threshold measure). In other embodiments, the hyper-parameter determination system 102 monitors other efficiency metrics, such as computer resources utilized to train the machine learning model 204.

As also shown, the hyper-parameter determination system 102 generates a new hyper-parameter set 208 to balance accuracy and training efficiency. More specifically, the hyper-parameter determination system 102 utilizes a trade-off acquisition function weighted in accordance with an accuracy-training efficiency balance metric to select hyper-parameters from a hyper-parameter space (e.g., from among the hyper-parameters 202). Utilizing the trade-off acquisition function, the hyper-parameter determination system 102 selects hyper-parameters based on a prediction of how the hyper-parameters will affect the accuracy metrics and the training efficiency metrics of the machine learning model 204. This joint optimization of both measures in an enriched hyper-parameter space leads to selecting more efficient and accurate hyper-parameters for the machine learning model 204.

In some embodiments, the hyper-parameter determination system 102 trains the machine learning model 204 (or another machine learning model) using the new hyper-parameter set 208. Particularly, the hyper-parameter determination system 102 re-trains the machine learning model 204 utilizing the new hyper-parameter set 208 generated based on the trade-off acquisition function. Based on the training, the hyper-parameter determination system 102 can determine new accuracy metrics and new training efficiency metrics for the machine learning model 204 to determine how the new hyper-parameter set 208 affects performance. The hyper-parameter determination system 102 can further repeat the process of analyzing the observed metrics, generating a new hyper-parameter set, and training the machine learning model 204 until the hyper-parameter determination system 102 identifies a hyper-parameter set that satisfies a threshold level of accuracy and/or a threshold level of training efficiency.

Figure 3:
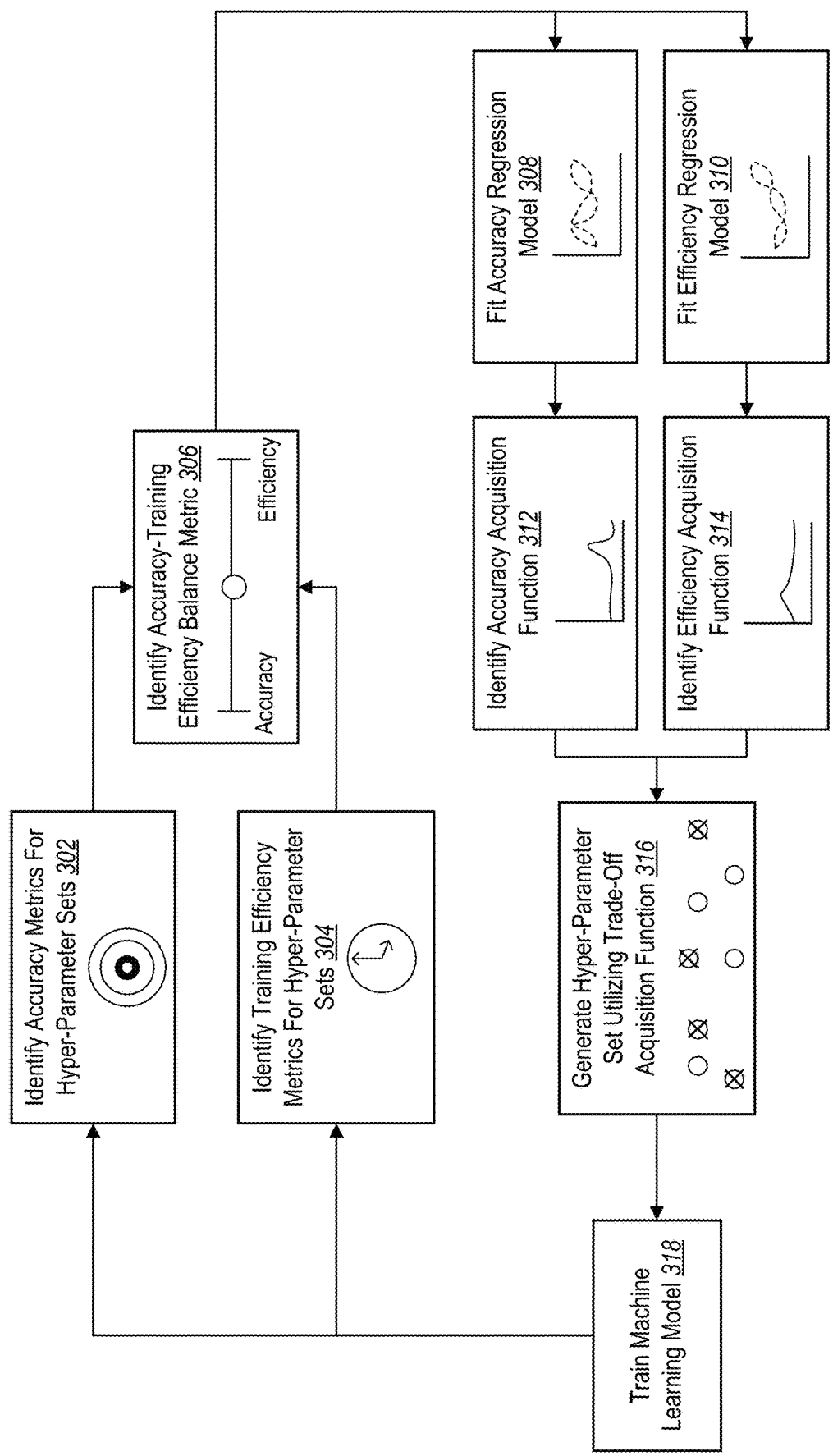
FIG. 3 illustrates an iterative process of generating hyper-parameter set and training a machine learning model in accordance with one or more embodiments.

As mentioned, the hyper-parameter determination system 102 can utilize an iterative technique to improve metrics of a machine learning model. For example, the hyper-parameter determination system 102 can generate a hyper-parameter set, train a machine learning model using the hyper-parameter set, determine accuracy metrics and training efficiency metrics for the machine learning model, and generate a new hyper-parameter set to improve the accuracy metrics and/or the training efficiency metrics. FIG. 3 illustrates a sequence of acts 302-318 that the hyper-parameter determination system 102 performs as part of an iterative process to select hyper-parameter sets for improving accuracy and/or training efficiency in accordance with one or more embodiments.

As illustrated in FIG. 3, the hyper-parameter determination system 102 performs an act 302 to identify accuracy metrics for one or more hyper-parameter sets. In particular, the hyper-parameter determination system 102 monitors performance of a machine learning model trained using an observed hyper-parameter set and determines how accurately the machine learning model performs a task. For example, the hyper-parameter determination system 102 determines a percentage or proportion of correct predictions generated by the machine learning model trained using the observed hyper-parameter set. Different hyper-parameter sets can result in different accuracies for the machine learning model.

Along similar lines, the hyper-parameter determination system 102 performs an act 304 to identify training efficiency metrics for one or more observed hyper-parameter sets. In particular, the hyper-parameter determination system 102 monitors training of a machine learning model trained using an observed hyper-parameter set and determines how efficiently the machine learning model is trained—e.g., by determining how long it takes to train the machine learning model. Different hyper-parameter sets can result in different training efficiencies (e.g., training times) for the machine learning model.

As shown, the hyper-parameter determination system 102 further performs an act 306 to identify an accuracy-training efficiency balance metric. In some embodiments, the hyper-parameter determination system 102 receives an indication of an accuracy-training efficiency balance metric from a client device such as administrator device (e.g., the client device 108) to dictate how to balance between accuracy and training efficiency. In other embodiments, the hyper-parameter determination system 102 automatically determines (e.g., determines without user input) an accuracy-training efficiency balance metric. For example, the hyper-parameter determination system 102 selects the accuracy-training efficiency balance metric based on a particular task (e.g., image classification or natural language processing) to be performed by the machine learning model. In one or more embodiments, the accuracy-training efficiency balance metric is a weight value between 0 (e.g., standard Bayesian optimization where training efficiency is not considered) and 1 (where training efficiency is most heavily weighted).

In some embodiments, the hyper-parameter determination system 102 applies an objective function utilizing the accuracy-training efficiency balance metric. In particular, the hyper-parameter determination system 102 utilizes an objective function to select hyper-parameters that result in a machine learning model that is both accurate and efficient. For example, the hyper-parameter determination system 102 utilizes an objective function that balances between accuracy and training efficiency in accordance with the accuracy-training efficiency balance metric. In some embodiments, the hyper-parameter determination system 102 utilizes an objective function of the form:

$$T_\alpha(\lambda) = L(\lambda) - \alpha \cdot \sigma(\lambda)$$

where $\alpha \geq 0$ is the accuracy-training efficiency balance metric that controls the relative weight or importance between accuracy L and training efficiency $\sigma$ for a machine learning model trained on the hyper-parameter set $\lambda$. In some embodiments, T is not a single measure, but a family of measures parameterized by the accuracy-training efficiency balance metric $\alpha$. By varying $\alpha$, the hyper-parameter determination system 102 can capture a full spectrum of accuracy/training efficiency tradeoffs: from $\alpha=0$ (e.g., default setting where training efficiency is not weighted or considered) to larger values of a that lead to more efficient machine learning models.

As illustrated in FIG. 3, the hyper-parameter determination system 102 further performs an act 308 to fit an accuracy regression model. More particularly, the hyper-parameter determination system 102 identifies or generates an accuracy regression model that fits the observed accuracy metrics associated with the machine learning model. For example, the hyper-parameter determination system 102 identifies pairs of hyper-parameter sets and corresponding observed accuracy metrics (e.g., observed accuracy metrics that result from a machine learning model trained using a particular hyper-parameter set). Based on the observed pairs, the hyper-parameter determination system 102 determines probability distributions of hyper-parameter sets corresponding to possible accuracy metrics. Indeed, the hyper-parameter determination system 102 fits an accuracy regression model that represents or reflects probabilities of various hyper-parameter sets corresponding to different accuracy metrics. Additional detail regarding the accuracy regression model is provided below with reference to subsequent figures.

Additionally, the hyper-parameter determination system 102 performs an act 310 to fit an efficiency regression model. Similar to the accuracy regression model, the hyper-parameter determination system 102 identifies or generates an efficiency regression model that fits the observed training efficiency metrics associated with the machine learning model. For example, the hyper-parameter determination system 102 identifies pairs of hyper-parameter sets and corresponding observed training efficiency metrics (e.g., observed training efficiency metrics that indicated a duration of time it takes to train a machine learning model using a particular hyper-parameter set). Based on the observed pairs, the hyper-parameter determination system 102 determines probability distributions of hyper-parameter sets corresponding to possible training efficiency metrics. Indeed, the hyper-parameter determination system 102 fits an efficiency regression model that represents or reflects probabilities of various hyper-parameter sets corresponding to different training efficiency metrics. Additional detail regarding the efficiency regression model is provided below with reference to subsequent figures.

As further shown, the hyper-parameter determination system 102 performs an act 312 to identify an accuracy acquisition function. In particular, the hyper-parameter determination system 102 identifies or generates an accuracy acquisition function to identify a next candidate hyper-parameter set with at least a threshold measure of improvement in accuracy over a current (best) hyper-parameter set. In some embodiments, the hyper-parameter determination system 102 identifies or generates the accuracy acquisition function based on the accuracy regression model that reflects (probabilities of) accuracies of hyper-parameter sets.

In addition to the accuracy acquisition function, the hyper-parameter determination system 102 performs an act 314 to identify an efficiency acquisition function. In particular, the hyper-parameter determination system 102 identifies or generates an efficiency acquisition function to identify a next candidate hyper-parameter set with at least a threshold measure of improvement in training efficiency over a current (best) hyper-parameter set. In some embodiments, the hyper-parameter determination system 102 identifies or generates the efficiency acquisition function based on the efficiency regression model that reflects (probabilities of) training efficiencies of hyper-parameter sets.

As shown, the hyper-parameter determination system 102 further performs an act 316 to generate a hyper-parameter set utilizing a trade-off acquisition function. Indeed, the hyper-parameter determination system 102 generates a hyper-parameter set based on a weighted combination of the accuracy acquisition function and the efficiency acquisition function. Specifically, the hyper-parameter determination system 102 selects hyper-parameters from a hyper-parameter space by utilizing a trade-off acquisition function that balances between the accuracy acquisition function and the efficiency acquisition function by weighting one function or the other using an accuracy-training efficiency balance metric. As shown, the hyper-parameter determination system 102 selects those hyper-parameters represented by circles that are not crossed off and refrains from selecting those that are crossed off.

Further, the hyper-parameter determination system 102 performs an act 318 to train a machine learning model. Particularly, the hyper-parameter determination system 102 trains a machine learning model utilizing the hyper-parameter set generated or selected as part of the act 316. Based on training the machine learning model using the generated hyper-parameter set, the hyper-parameter determination system 102 further repeats the acts 302-318 to improve the hyper-parameter set ultimately selected by the hyper-parameter determination system 102. To elaborate, the hyper-parameter determination system 102 identifies accuracy metrics and training efficiency metrics associated with the machine learning model trained using the hyper-parameter set. The hyper-parameter determination system 102 further fits regression models and utilizes a trade-off acquisition function to generate a new hyper-parameter set to use for re-training the machine learning model. The hyper-parameter determination system 102 can repeat the process until a hyper-parameter set results in the machine learning model satisfying a threshold accuracy and/or a threshold training efficiency (and/or for a threshold number of iterations).

While FIG. 3 illustrates a particular number and sequence of the acts 302-318, in some embodiments, the hyper-parameter determination system 102 performs a different number and/or sequence of acts. For example, the hyper-parameter determination system 102 can perform the acts 306 and 316 separately from the iterative process of training the machine learning model. Indeed, the hyper-parameter determination system 102 can identify an accuracy-training efficiency balance metric that weights a trade-off acquisition function independently of the iterative training process. Thus, the hyper-parameter determination system 102 identifies the accuracy metrics (e.g., the act 302) and the training efficiency metrics (e.g., the act 304) followed by fitting the accuracy regression model (e.g., the act 308) and fitting the efficiency regression model (e.g., the act 310), respectively. Based on the objective function, the hyper-parameter determination system 102 separately determines how to combine (e.g., weight) the accuracy regression model and the efficiency regression model using a trade-off acquisition function (e.g., the act 316).

As another act for the hyper-parameter determination system 102, in one or more embodiments, the hyper-parameter determination system 102 selects a machine learning model based on its balance between accuracy and training efficiency. More specifically, the hyper-parameter determination system 102 can utilize a trade-off acquisition function to generate a hyper-parameter set for training multiple machine learning models (e.g., a first machine learning model and a second machine learning model), and the hyper-parameter determination system 102 can compare the resultant accuracy metrics and training efficiency metrics associated with the respective machine learning models. In some embodiments, the hyper-parameter determination system 102 selects a machine learning model based on balance between accuracy and training efficiency for a particular application (e.g., the hyper-parameter set that maximizes the trade-off acquisition function). For a natural language task, for example, the hyper-parameter determination system 102 can select a neural network or some other machine learning model that satisfies a threshold accuracy and a threshold training efficiency when trained using a particular hyper-parameter set.

In some embodiments, the hyper-parameter determination system 102 performs one or more of the acts 302-318 of FIG. 3 in accordance with a particular computer-implemented algorithm. For example, the hyper-parameter determination system 102 utilizes the following Algorithm 1. Indeed, in some embodiments, the hyper-parameter determination system 102 generates a hyper-parameter set utilizing Algorithm 1, as follows:

---

Algorithm 1: Bayesian Optimization for Learning Based on an Accuracy-Training Efficiency Balance Metric Input: Objective function (or loss function) T, number of iterations S, initialization hyper-parameter set $\lambda_{1:k}$
Output: Selected hyper-parameter set $\lambda^*$
for: i = 1 to k do
    $L_i$ = Evaluate $L(\lambda_i)$
    $\sigma_i$ = Evaluate $\sigma(\lambda_i)$
end
for j = k + 1 to S do
    $V_L$: accuracy regression model on $<\lambda_i, L_i>_{i=1}^{j-1}$
    $V_\sigma$: efficiency regression model on $<\lambda_i, \sigma_i>_{i=1}^{j-1}$
    $\lambda_j = \arg\max_{\lambda \in \Lambda} \alpha_T(\lambda)$
    $L_j$ = Evaluate $L(\lambda_j)$
    $\sigma_j$ = Evaluate $\sigma(\lambda_j)$
end
return $\lambda^* = \arg\max_{\lambda \in (\lambda_1,...,\lambda_S)} L(\lambda) - \alpha \cdot \sigma(\lambda)$

---

As shown, the Algorithm 1 proceeds in a number of rounds or iterations. The hyper-parameter determination system 102 starts by training a machine learning model (e.g., the machine learning model 604) on an initial hyper-parameter set. In some embodiments, the hyper-parameter determination system 102 utilizes a Sobol sequence to initialize the first stage (e.g., where the value of k for the first stage is the number of points in the Sobol sequence), as described by J. Snoek, H. Larochelle, and R. Adams in *Practical Bayesian Optimization*, NIPS, Advances in Neural Information Processing Systems (2014), which is incorporated herein by reference in its entirety.

The hyper-parameter determination system 102 continues the Algorithm 1 by recording accuracy metrics such as validation accuracies (e.g., the $L_i$ values) and training efficiency metrics (e.g., the $\sigma_i$ values) from the initial hyper-parameter set. In addition, the hyper-parameter determination system 102 iterates through three stages: 1) fitting Gaussian probabilistic regression models $V_L$ and $V_\sigma$ for accuracy and training efficiency, respectively, over pairs of collected hyper-parameter sets and accuracy metrics as well as pairs of hyper-parameter sets and training efficiency metrics, 2) using the regression models $V_L$ and $V_\sigma$ to determine a trade-off acquisition function $a_T(\lambda)$ and selecting an input hyper-parameter set $\lambda_j$ to evaluate next by quantifying the desirability of obtaining the trade-off acquisition function value at $\lambda_j$ through $a_T(\lambda)$, and 3) training a machine learning model with the selected hyper-parameter set and recording the accuracy ($L_j$) and the training efficiency $\sigma_j$ to utilize for regression models in the next round.

In some embodiments, the hyper-parameter determination system 102 searches an enriched hyper-parameter space which augments the original space by including training set size as a hyper-parameter, with candidates selected from varying fractions of a full set size (e.g., 20%, 40%, 60%, 80%, and 100%). In these or other embodiments, the hyper-parameter determination system 102 selects values for k and the number of iterations S. For example, the hyper-parameter determination system 102 selects S=20 and k=3 to balance between accuracy and training efficiency in some cases.

In some embodiments, the hyper-parameter determination system 102 can perform a step for generating a hyper-parameter set based on accuracy and training efficiency associated with the observed hyper-parameter sets. The above description of FIG. 3 (e.g., the acts 302-318 and/or the description relating to Algorithm 1) can provide the corresponding structure, algorithms, or acts for performing a step for generating a hyper-parameter set based on accuracy and training efficiency associated with the observed hyper-parameter sets.

Figure 4A:
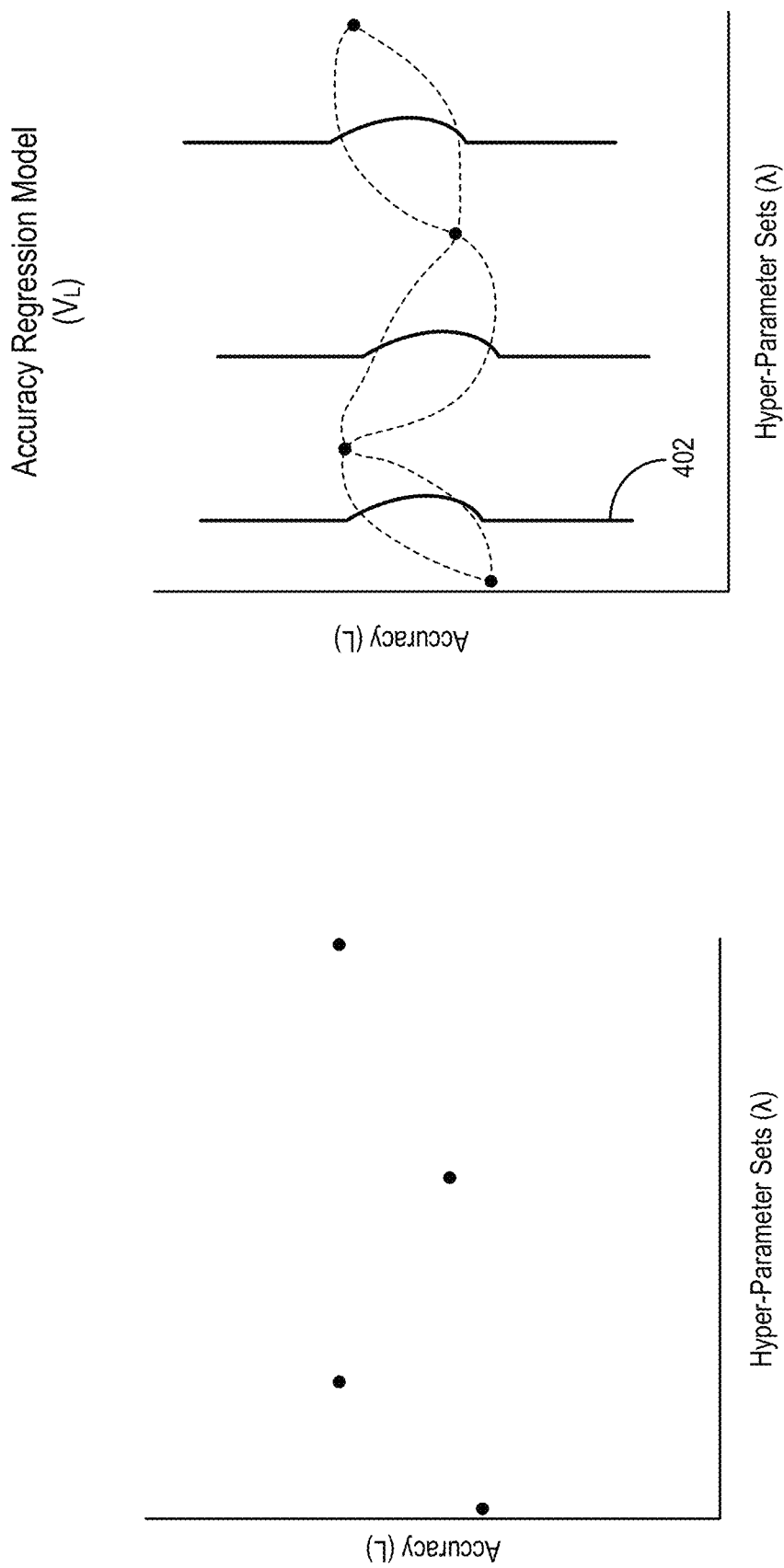
FIG. 4A illustrates fitting an accuracy regression model in accordance with one or more embodiments.

As mentioned above, the hyper-parameter determination system 102 can fit an accuracy regression model to pairs of observed hyper-parameter sets and corresponding observed accuracy metrics. FIG. 4A illustrates fitting an accuracy regression model in accordance with one or more embodiments. As shown, the hyper-parameter determination system 102 identifies pairs of hyper-parameter sets and accuracy metrics (represented by the dots within the graphs). The pairs identified within FIG. 4A are merely illustrative for discussion purposes and do not necessarily represent actual observations of the hyper-parameter determination system 102. Moreover, although FIG. 4A illustrates a two-dimensional feature space for ease of illustration, it will be appreciated that the hyper-parameter determination system 102 can operate with regard to a higher dimensionality feature space (e.g., model interactions between multiple different hyper-parameters with regard to training efficiency and accuracy)

As illustrated, the hyper-parameter determination system 102 identifies four pairs, each pair including a hyper-parameter set (e.g., an observed hyper-parameter set) and a corresponding accuracy metric. Particularly, the hyper-parameter determination system 102 determines accuracy metrics associated with the hyper-parameter sets by determining a percentage of times (or a probability of) a machine learning model trained using the hyper-parameter set correctly predicting a result. For example, the hyper-parameter determination system 102 identifies hyper-parameters from an enriched hyper-parameter space that includes extrinsic hyper-parameters such as training set size. The hyper-parameter determination system 102 further determines accuracy metrics associated with particular hyper-parameters (or sets of hyper-parameters). In some embodiments, the hyper-parameter determination system 102 identifies enriched hyper-parameter sets as given by:

$$\lambda = \{\lambda_1, \ldots, \lambda_m\}$$

where $\lambda_1$ represents the first hyper-parameter set of m hyper-parameter sets within the space, and where $\{\Lambda_1, \ldots, \Lambda_m\}$ represents their respective domains.

As further illustrated in FIG. 4A, the hyper-parameter determination system 102 fits an accuracy regression model to the pairs of hyper-parameter sets and accuracy metrics. Indeed, the hyper-parameter determination system 102 fits an accuracy regression model represented by $V_L$ based on probabilities of hyper-parameters (or hyper-parameter sets) corresponding to possible accuracy metrics. For example, the hyper-parameter determination system 102 determines probability distributions of accuracy metrics corresponding to hyper-parameter sets. In some embodiments, the hyper-parameter determination system 102 determines a separate probability distribution for each of a number of possible hyper-parameter sets (e.g., possible combinations of hyper-parameters from the enriched hyper-parameter space).

A probability distribution, such as the probability distribution 402, can correspond to a particular a hyper-parameter set and can reflect probabilities of different accuracy metrics corresponding to the hyper-parameter set (e.g., based on a Gaussian probability distribution that appears to "pop out" from the page in a vertical direction toward the viewer). In some embodiments, the hyper-parameter determination system 102 conditions the accuracy regression model (or the probability distributions) by the observed hyper-parameter sets and the associated accuracy metrics.

For example, the hyper-parameter determination system 102 fits the accuracy regression model conditioned on the observed pairs such that the model converges on the observed pairs (e.g., because observed pairs of hyper-parameter sets and accuracy metrics are points with 100% probabilities of correspondence), and spaces between the observed pairs have probability distributions that spread outward. As shown, the hyper-parameter determination system 102 observes four pairs of hyper-parameter sets and associated accuracy metrics, and the hyper-parameter determination system 102 fits an accuracy regression model in accordance with probabilities of hyper-parameter sets matching accuracy metrics conditioned by the four observed pairs, as represented by the dotted lines. While the hyper-parameter determination system 102 can utilize a variety of different regression models, in some embodiments, the hyper-parameter determination system 102 utilizes a particular accuracy regression model such as a Gaussian Process prior model described by J. Snoek et al.

Figure 4B:
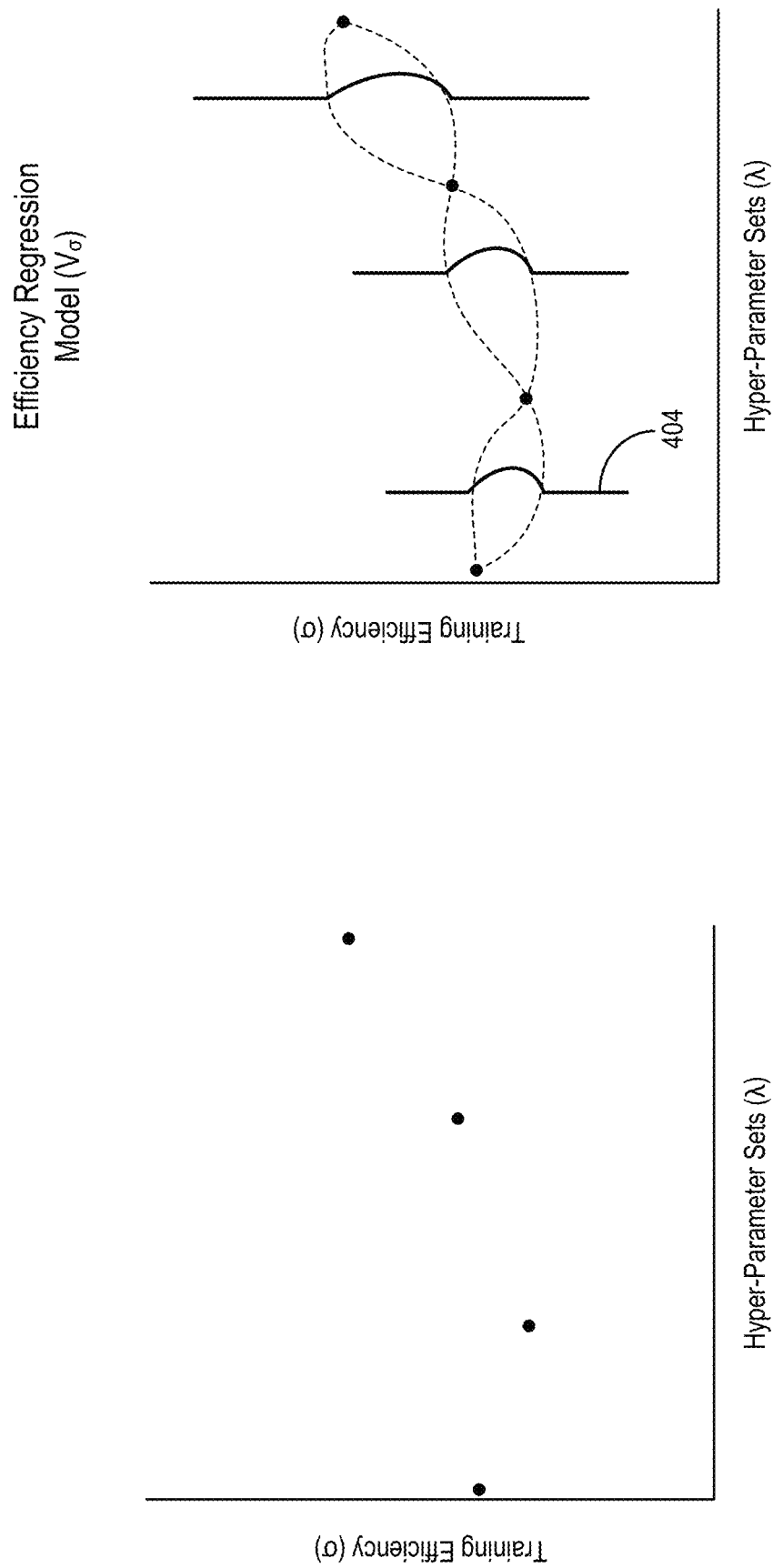
FIG. 4B illustrates fitting an efficiency regression model in accordance with one or more embodiments.

As mentioned, the hyper-parameter determination system 102 can fit an efficiency regression model to pairs of observed hyper-parameter sets and corresponding observed training efficiency metrics. FIG. 4B illustrates fitting an efficiency regression model in accordance with one or more embodiments. As shown, the hyper-parameter determination system 102 identifies pairs of hyper-parameter sets (e.g., observed hyper-parameter sets) and training efficiency metrics (represented by the dots within the graphs). The pairs identified within FIG. 4B are merely illustrative for discussion purposes and do not necessarily represent actual observations of the hyper-parameter determination system 102.

As illustrated, the hyper-parameter determination system 102 identifies observed pairs of hyper-parameter sets and associated training efficiency metrics. Indeed, the hyper-parameter determination system 102 identifies hyper-parameters to test from the enriched hyper-parameter space and generates different combinations for the hyper-parameter sets. The hyper-parameter determination system 102 further determines how the identified hyper-parameter sets affect the training of a machine learning model to determine the observed training efficiency metrics. For instance, some hyper-parameter sets may result in longer training times than others, as plotted in the graphs of FIG. 4B.

As further illustrated, the hyper-parameter determination system 102 fits an efficiency regression model to the observed hyper-parameter sets and the associated training efficiency metrics. Similar to the discussion above regarding accuracy, the hyper-parameter determination system 102 determines an efficiency regression model $V_\sigma$ that reflects training efficiencies of different hyper-parameter sets. Indeed, the hyper-parameter determination system 102 determines probability distributions for hyper-parameter sets (as represented by the curves along the training efficiency axis, illustrated as though they appear to "pop out" from the page in a vertical direction toward the viewer) that indicate probabilities of various training efficiencies corresponding to hyper-parameter sets. For example, the hyper-parameter determination system 102 determines the probability distribution 404 for a particular hyper-parameter set, thereby indicating probabilities of various training efficiencies corresponding to the hyper-parameter set.

As described above in relation to FIG. 4A, the hyper-parameter determination system 102 conditions the efficiency regression model by the observed hyper-parameter sets and the associated training efficiency metrics. To elaborate, the hyper-parameter determination system 102 fits the efficiency regression model as shown by the dotted lines, such that the model converges on the observed pairs and spreads out between the observed pairs in accordance with the various probability distributions. In some embodiments, the hyper-parameter determination system 102 utilizes an efficiency regression model such as that described by J. Snoek et al.

Figure 5:
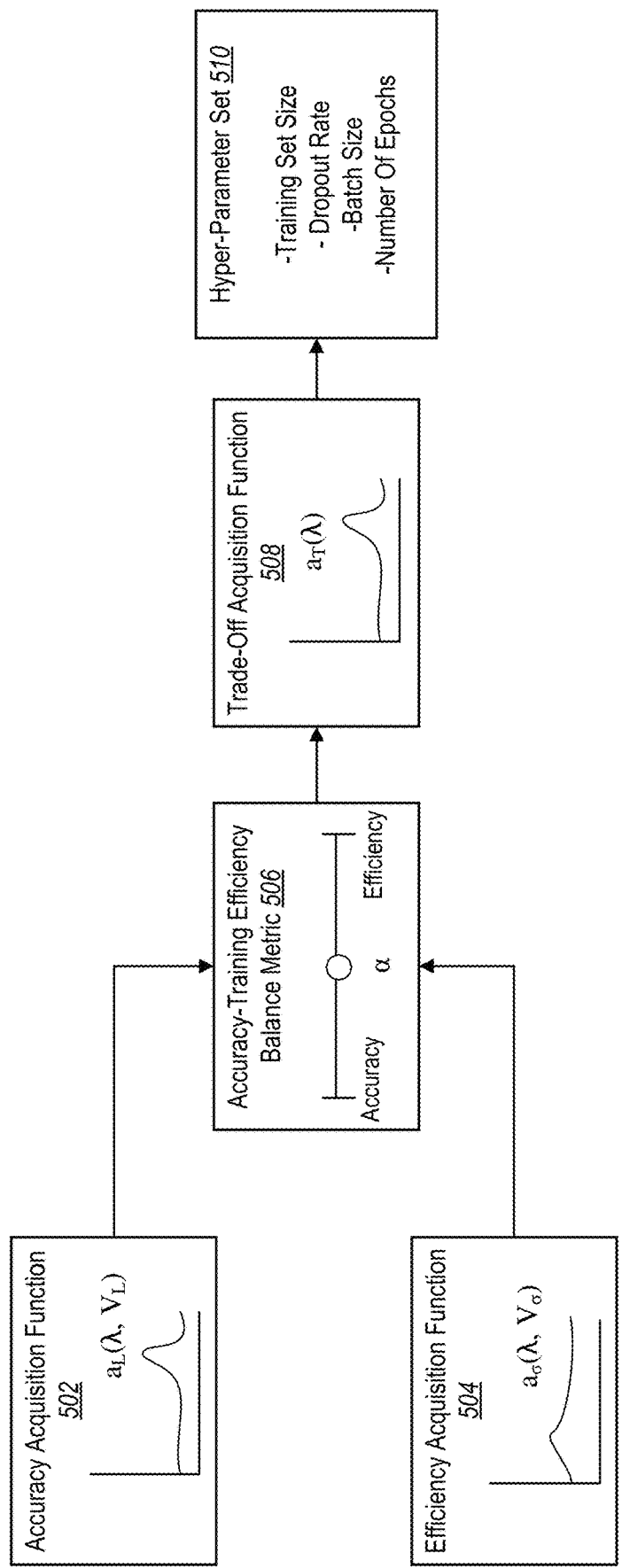
FIG. 5 illustrates utilizing a trade-off acquisition function to generate a hyper-parameter set in accordance with one or more embodiments.

As mentioned, the hyper-parameter determination system 102 can utilize a trade-off acquisition function to generate a hyper-parameter set that balances accuracy and training efficiency based on an accuracy regression model (e.g., from FIG. 4A) and an efficiency regression model (e.g., from FIG. 4B). In particular, the hyper-parameter determination system 102 can utilize an accuracy-training efficiency balance metric to balance between selecting hyper-parameters in accordance with the accuracy regression model and selecting hyper-parameters in accordance with the efficiency regression model. FIG. 5 illustrates an example flow diagram for generating a hyper-parameter set utilizing an accuracy acquisition function and an efficiency acquisition function in accordance with one or more embodiments.

As illustrated in FIG. 5, the hyper-parameter determination system 102 identifies or determines an accuracy acquisition function 502. In particular, the hyper-parameter determination system 102 identifies the accuracy acquisition function 502 that can select a next hyper-parameter set that will (or that is predicted to) result in at least a threshold (e.g., the highest) improvement in accuracy over a current best accuracy L*. For example, the hyper-parameter determination system 102 utilizes an accuracy acquisition function 502 that represents the expected improvement over accuracy, as given by:

$$a_L(\lambda, V_L) = \int_{-\infty}^{\infty} \max(L - L^*, 0) p_{V_L}(L|\lambda) d_L$$

where $p_{V_L}(L|\lambda)$ represents the probability of obtaining accuracy L given the hyper-parameter set $\lambda$. In some embodiments, $p_{V_L}(L|\lambda)$ is encoded by an accuracy regression model (e.g., from FIG. 4A). In one or more embodiments, the hyper-parameter determination system 102 utilizes an accuracy acquisition function of the form described by E. Brochu, V. Cora, and N. Freitas in *A Tutorial on Bayesian Optimization of Expensive Cost Functions, with Application to Active User Modeling and Hierarchical Reinforcement Learning*, arXiv:1012.2599v1 (December 2010), which is incorporated herein by reference in its entirety.

As also illustrated in FIG. 5, the hyper-parameter determination system 102 identifies or determines an efficiency acquisition function 504. In particular, the hyper-parameter determination system 102 identifies an efficiency acquisition function 504 that selects a next candidate hyper-parameter set that results in at least a threshold (e.g., a highest) increase in training efficiency over a current best training efficiency $\sigma^*$. For example, the hyper-parameter determination system 102 utilizes an efficiency acquisition function 504 that represents the expected improvement over training efficiency, as given by:

$$a_\sigma(\lambda, V_\sigma) = \int_{-\infty}^{\infty} \max(\sigma - \sigma^*, 0) p_{V_\sigma}(\sigma|\lambda) d_\sigma$$

where $p_{V_\sigma}(\sigma|\lambda)$ represents the probability of obtaining training efficiency $\sigma$ given the hyper-parameter set $\lambda$. In some embodiments, $p_{V_\sigma}(\sigma|\lambda)$ is encoded by an efficiency regression model (e.g., from FIG. 4B). In one or more embodiments, the hyper-parameter determination system 102 utilizes an efficiency acquisition function of the form described by E. Brochu et al.

To generate a hyper-parameter set based on the accuracy acquisition function 502 and the efficiency acquisition function 504, the hyper-parameter determination system 102 identifies or determines an accuracy-training efficiency balance metric 506. Particularly, the hyper-parameter determination system 102 receives an input to set the accuracy-training efficiency balance metric 506 or else determines the accuracy-training efficiency balance metric 506 based on how accurate or how efficient a resultant machine learning model needs to be (e.g., based on its application or task). As illustrated in FIG. 5, the hyper-parameter determination system 102 determines an accuracy-training efficiency balance metric 506 as represented by the symbol $\alpha$. In some embodiments, the accuracy-training efficiency balance metric can be between 0 and 1, where values closer to 0 weight training efficiency less heavily and values closer to 1 weight training efficiency more heavily.

Indeed, to weight accuracy versus training efficiency, the hyper-parameter determination system 102 utilizes a trade-off acquisition function 508. More specifically, the hyper-parameter determination system 102 utilizes a trade-off acquisition function 508 that is based on the objective function described above in relation to FIG. 3. For example, the hyper-parameter determination system 102 utilizes a trade-off acquisition function 508 that selects a next hyper-parameter set that satisfies a threshold measure (e.g., a highest) increase in weighted accuracy-training efficiency. Indeed, the hyper-parameter determination system 102 determines and applies a trade-off acquisition function 508, as given by:

$$a_T(\lambda) = a_L(\lambda, V_L) - \alpha \cdot a_\sigma(\lambda, V_\sigma)$$

where $\alpha$ represents the accuracy-training efficiency balance metric 506 and where $a_L(\lambda, V_L)$ and $a_\sigma(\lambda, V_\sigma)$ are the accuracy acquisition function 502 and the efficiency regression acquisition 504, respectively (as discussed above).

The hyper-parameter determination system 102 thus applies the trade-off acquisition function 508 to select hyper-parameters from an enriched hyper-parameter space that includes possible hyper-parameters for training a machine learning model. Indeed, the hyper-parameter determination system 102 applies the trade-off acquisition function 508 to generate the hyper-parameter set 510. In some embodiments, the hyper-parameter set 510 includes hyper-parameters that result in a threshold (e.g., highest) increase in the weighted combination of accuracy and training efficiency. Although this is merely an example, as shown, the hyper-parameter set 510 includes hyper-parameters such as a training set size, a dropout rate, a batch size, and a number of epochs.

Figure 6:
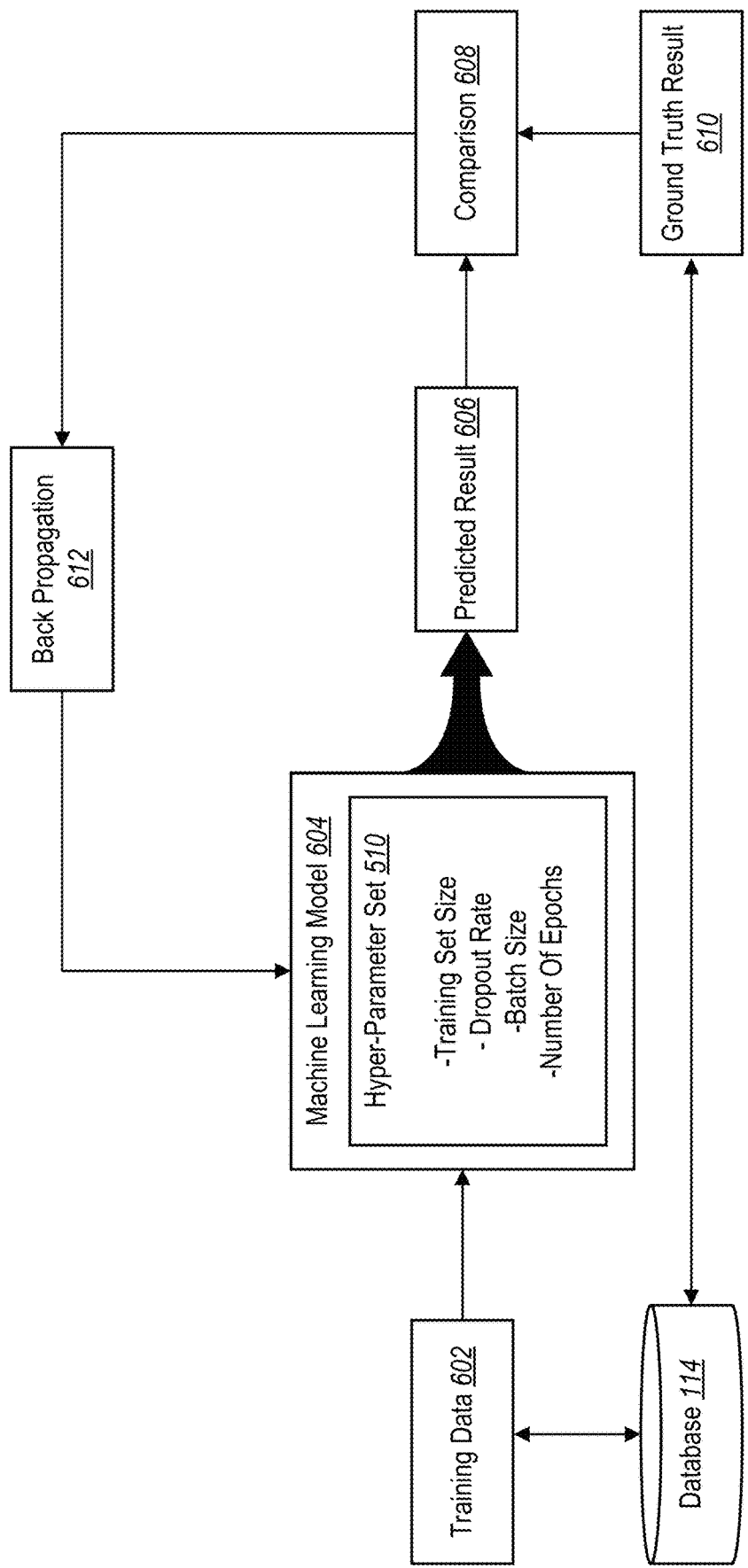
FIG. 6 illustrates training a machine learning model utilizing a hyper-parameter set in accordance with one or more embodiments.

As mentioned above, the hyper-parameter determination system 102 can utilize a generated hyper-parameter set (e.g., the hyper-parameter set 510) to train a machine learning model (e.g., the machine learning model 204). In particular, the hyper-parameter determination system 102 can train a machine learning model to perform a particular task such as digital image classification or natural language processing. FIG. 6 illustrates training a machine learning model 604 (e.g., the machine learning model 204) utilizing the hyper-parameter set 510 in accordance with one or more embodiments.

As illustrated in FIG. 6, the hyper-parameter determination system 102 accesses or identifies training data 602 from the database 114. Indeed, the hyper-parameter determination system 102 identifies training data to process via the machine learning model 604 for generating predictions. Training data 602 can include data that the hyper-parameter determination system 102 utilizes to test the accuracy of the machine learning model 604 in performing a particular task. For instance, the hyper-parameter determination system 102 can utilize a machine learning model 604 to classify digital images, where the training data 602 includes digital images that depict particular objects that the machine learning model 604 attempts to classify by generating predicted classifications.

Indeed, the hyper-parameter determination system 102 inputs the training data 602 into the machine learning model 604, whereupon the machine learning model 604 generates a predicted result 606. More specifically, the machine learning model 604 generates the predicted result 606 by processing the training data 602 in accordance with the hyper-parameter set 510, by passing data between various layers (e.g., in the case of a neural network) to ultimately generate an output.

Based on generating the predicted result 606, the hyper-parameter determination system 102 further performs a comparison 608. In particular, the hyper-parameter determination system 102 compares the predicted result 606 with a ground truth result 610. Indeed, the hyper-parameter determination system 102 identifies or accesses the ground truth result 610 from the database 114, where the ground truth result 610 corresponds to the training data 602. For example, the ground truth result 610 reflects the actual or ground truth result that should result from processing the training data 602 via the machine learning model 604.

To implement the comparison 608, the hyper-parameter determination system 102 can utilize one or more loss functions such as a cross entropy loss function, a regression loss function, or a mean squared error loss function. The hyper-parameter determination system 102 thus determines a measure of error or loss associated with the machine learning model 604 by comparing how close (or not close) the machine learning model 604 came with its the predicted result 606 to the ground truth result 610.

By comparing the predicted result 606 with the ground truth result 610, the hyper-parameter determination system 102 the hyper-parameter determination system 102 further performs a back propagation 612.

Particularly, the hyper-parameter determination system 102 performs the back propagation 612 to modify one or more weights or internal parameters of the machine learning model 604 (other than the hyper-parameters of the hyper-parameter set 510) in an effort to reduce or minimize the measure of loss. Indeed, the hyper-parameter determination system 102 modifies the weights or parameters by changing values to adjust how the machine learning model 604 analyzes data. Indeed, by changing various internal parameters, the hyper-parameter determination system 102 modifies how the machine learning model 604 passes data between layers (e.g., with regard to a neural network) and thereby modifies how the machine learning model 604 generates predictions.

The hyper-parameter determination system 102 can further repeat the training process illustrated in FIG. 6 for multiple iterations or epochs until the machine learning model 604 satisfies a threshold level of accuracy or until the measure of loss associated with the machine learning model 604 satisfies a threshold level. For example, the hyper-parameter determination system 102 can select new training data to input into the machine learning model 604, whereupon the machine learning model 604 generates a new predicted result. The hyper-parameter determination system 102 can further identify a new ground truth result to compare with the new predicted result and can utilize a loss function to determine a new measure of loss associated with the machine learning model 604. The hyper-parameter determination system 102 can further back propagate modify internal parameters to further reduce the measure of loss.

Over multiple iterations or epochs, the hyper-parameter determination system 102 reduces the error or measure of loss until it satisfies a threshold—or until the accuracy of machine learning model 604 satisfies a threshold. Indeed, the hyper-parameter determination system 102 determines an accuracy associated with the machine learning model 604 based on training it with the hyper-parameter set 510.

Although FIG. 5 frequently refers to training with regard to neural network implementations, it will be appreciated that the hyper-parameter determination system 102 can train a variety of machine learning models. For example, the hyper-parameter determination system 102 can train support vector machines, random forest algorithms, decision trees, autoencoders, or other machine learning models.

Figure 7:
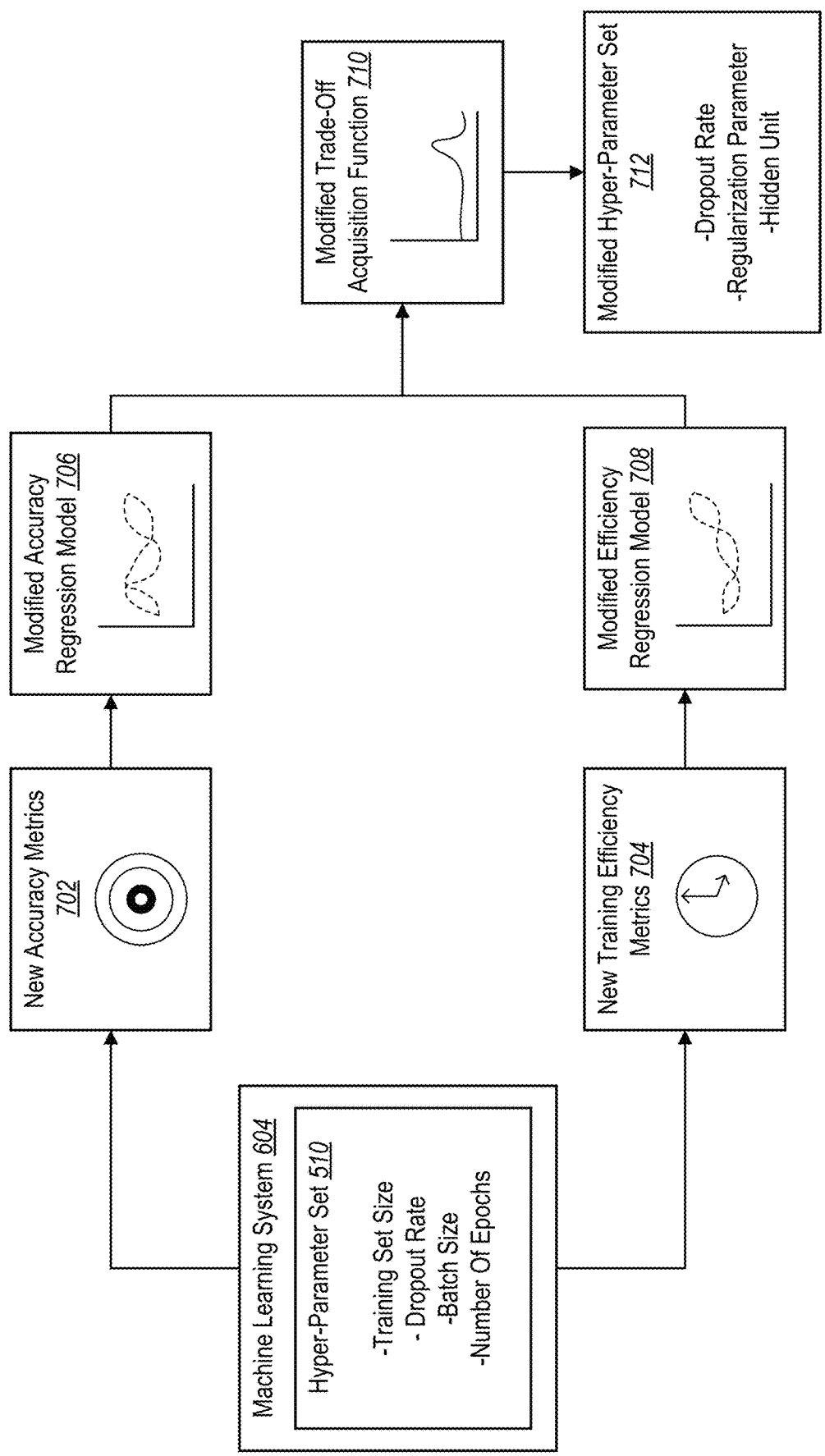
FIG. 7 illustrates generating a modified hyper-parameter set based on determining new metrics for a machine learning model in accordance with one or more embodiments.

As mentioned, the hyper-parameter determination system 102 can determine new accuracy metrics for the machine learning model 604 to use for generating a modified hyper-parameter set. FIG. 7 illustrates generating a modified hyper-parameter set 712 by determining new accuracy metrics 702 and new training efficiency metrics 704 in accordance with one or more embodiments.

As illustrated in FIG. 7, the hyper-parameter determination system 102 determines new accuracy metrics 702 and new training efficiency metrics 704 for a machine learning model (e.g., the machine learning model 604) trained utilizing a generated hyper-parameter set. For example, the hyper-parameter determination system 102 determines the new accuracy metrics 702 by evaluating how accurately the machine learning model 604 generates a prediction. In some embodiments, the hyper-parameter determination system 102 determines a measure of how close a predicted result is when compared to a ground truth result. In other embodiments, the hyper-parameter determination system 102 determines a proportion or a percentage of how often the machine learning model 604 correctly generates predicted results when compared to respective ground truth results.

Beyond determining the new accuracy metrics 702 associated with the machine learning model 604, the hyper-parameter determination system 102 further determines new training efficiency metrics 704. For example, the hyper-parameter determination system 102 measures a duration of time that it takes for the hyper-parameter determination system 102 to iterate through a threshold number of epochs or a duration of time that it takes for the hyper-parameter determination system 102 to train the machine learning model 604 to achieve at least a threshold accuracy (e.g., where the measure of loss is below a threshold).

As illustrated in FIG. 7, the hyper-parameter determination system 102 further utilizes a modified accuracy regression model 706. Specifically, the hyper-parameter determination system 102 modifies an accuracy regression model (e.g., the accuracy regression model of FIG. 4A) to fit the hyper-parameter set 510 and the associated new accuracy metrics 702. Thus, the modified accuracy regression model 706 fits the new data pair (that includes the hyper-parameter set 510 and the associated new accuracy metrics 702) along with previous data pairs as well.

In a similar fashion, the hyper-parameter determination system 102 utilizes a modified efficiency regression model 708. In particular, the hyper-parameter determination system 102 modifies an efficiency regression model (e.g., the efficiency regression model of FIG. 4B) to fit the hyper-parameter set 510 and the associated new training efficiency metrics 704. For example, the hyper-parameter determination system 102 fits the modified efficiency regression model 708 to the new data pair (including the hyper-parameter set 510 and the associated new training efficiency metrics 704) along with previous data pairs as well.

In addition, the hyper-parameter determination system 102 utilizes a modified trade-off acquisition function 710. To elaborate, the hyper-parameter determination system 102 utilizes the modified trade-off acquisition function 710 to select hyper-parameters based on the modified accuracy regression model 706 and the modified efficiency regression model 708. In some embodiments, the hyper-parameter determination system 102 determines the modified trade-off acquisition function 710 as a weighted combination of a modified accuracy acquisition model (which utilizes the modified accuracy regression model 706) and a modified efficiency acquisition model (which utilizes the modified efficiency regression model 708).

As shown, the hyper-parameter determination system 102 utilizes the modified trade-off acquisition function 710 to generate a modified hyper-parameter set 712. Indeed, the hyper-parameter determination system 102 generates the modified hyper-parameter set 712 to include different hyper-parameters than the hyper-parameter set 510. As illustrated, the modified hyper-parameter set 712 includes a dropout rate, a regularization parameter, and a hidden unit. The hyper-parameter determination system 102 can further determine accuracy metrics and training efficiency metrics associated with the modified hyper-parameter set 712. Indeed, the hyper-parameter determination system 102 can repeat the iterative process of generating hyper-parameter sets, determining metrics, fitting regression models, and determining new hyper-parameter sets to select a hyper-parameter set that satisfies both a threshold accuracy and a threshold training efficiency.

Figure 8:
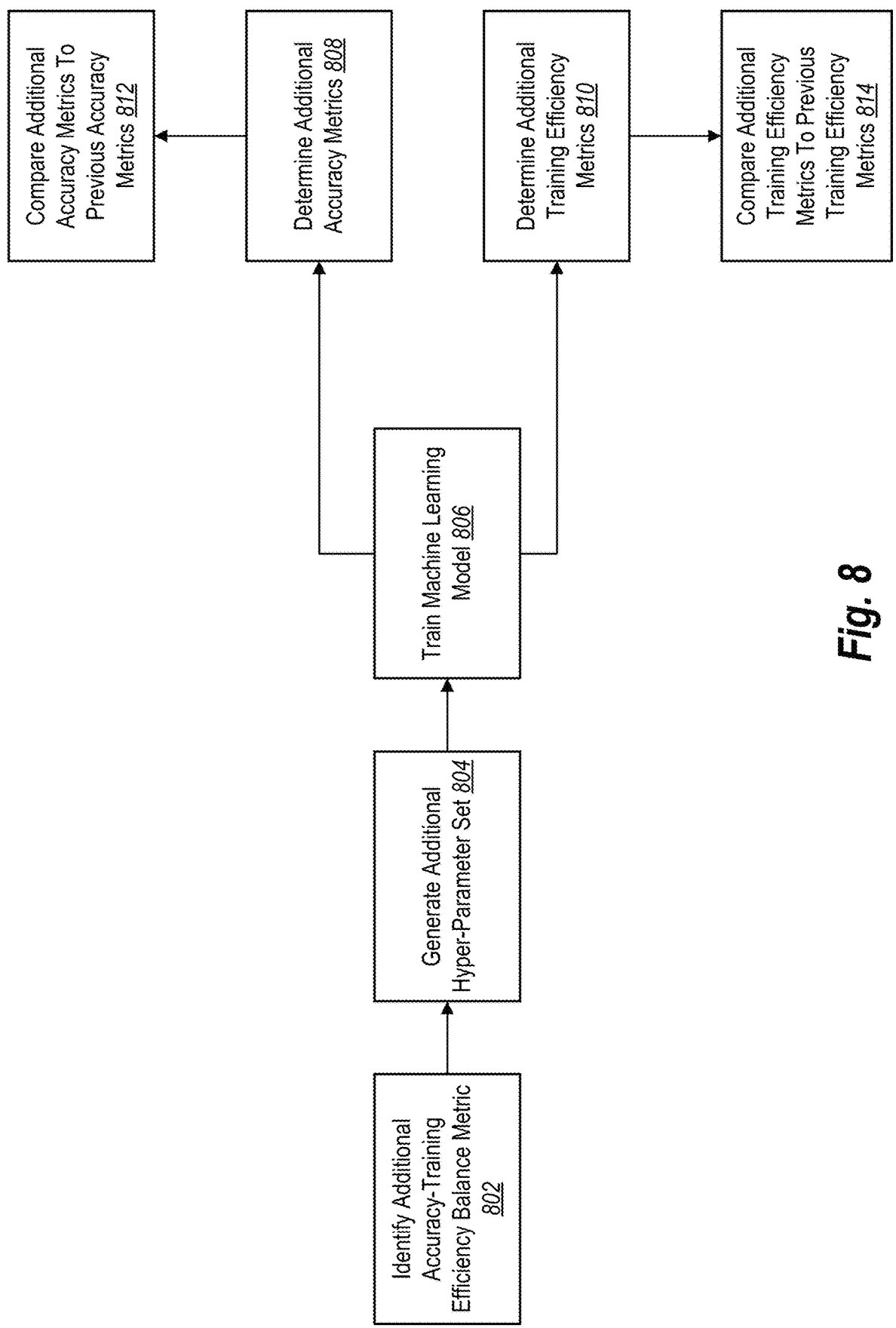
FIG. 8 illustrates determining additional accuracy metrics and additional training efficiency metrics for a machine learning model based on an additional accuracy-training efficiency balance metric in accordance with one or more embodiments.

As mentioned above, the hyper-parameter determination system 102 can generate additional hyper-parameter sets based on additional accuracy-training efficiency balance metrics. FIG. 8 illustrates generating an additional hyper-parameter set utilizing an additional accuracy-training efficiency balance metric in accordance with one or more embodiments.

As illustrated in FIG. 8, the hyper-parameter determination system 102 performs an act 802 to identify an additional accuracy-training efficiency balance metric. In particular, the hyper-parameter determination system 102 hyper-parameter determination system 102 receives an indication of an additional accuracy-training efficiency balance metric (e.g., a new a) from an administrator device (e.g., the client device 108). In some embodiments, the hyper-parameter determination system 102 determines a new accuracy-training efficiency balance metric to utilize based on one or more factors such a type of machine learning model to train, a desired accuracy, and/or a desired training efficiency.

In addition, the hyper-parameter determination system 102 performs an act 804 to generate an additional hyper-parameter set. To determine the additional hyper-parameter set, the hyper-parameter determination system 102 utilizes a trade-off acquisition function that weights an accuracy regression model and an efficiency acquisition model utilizing the additional accuracy-training efficiency balance metric. Indeed, the hyper-parameter determination system 102 utilizes the trade-off acquisition function to select hyper-parameters from a hyper-parameter space to best satisfy (e.g., maximize) the trade-off acquisition function that specifies a balance between accuracy and training efficiency.

Further, hyper-parameter determination system 102 performs an act 806 to train a machine learning model. In particular, the hyper-parameter determination system 102 trains a machine learning model such as the machine learning model 604 utilizing the additional hyper-parameter set. Based on the training, the hyper-parameter determination system 102 performs an act 808 to determine additional accuracy metrics as well as an act 810 to determine additional training efficiency metrics associated with the additional hyper-parameter set.

Based on determining the additional accuracy metrics, the hyper-parameter determination system 102 further performs an act 812 to compare the additional accuracy metrics to previous accuracy metrics. Particularly, the hyper-parameter determination system 102 compares the additional accuracy metrics to accuracy metrics associated with previous hyper-parameter sets. The hyper-parameter determination system 102 thus determines how the additional accuracy-training efficiency balance metric affects accuracy with respect to a given machine learning model.

Based on determining the additional training efficiency metrics, the hyper-parameter determination system 102 further performs an act 814 to compare the additional training efficiency metrics with previous training efficiency metrics. Indeed, the hyper-parameter determination system 102 compares the additional training efficiency metrics to training efficiency metrics associated with previous hyper-parameter sets. The hyper-parameter determination system 102 thus determines how the additional accuracy-training efficiency balance metric affects training efficiency with respect to a given machine learning model.

The hyper-parameter determination system 102 can further select a particular accuracy-training efficiency balance metric based on comparing metrics to see which value of for the accuracy-training efficiency balance metric yields a desired result. For example, the hyper-parameter determination system 102 identifies an accuracy-training efficiency balance metric that results in a threshold accuracy and a threshold training efficiency.

As mentioned, researchers have conducted experiments to demonstrate that the hyper-parameter determination system 102 can improve flexibility and efficiency of conventional systems in accordance with one or more embodiments.

Figure 9A:
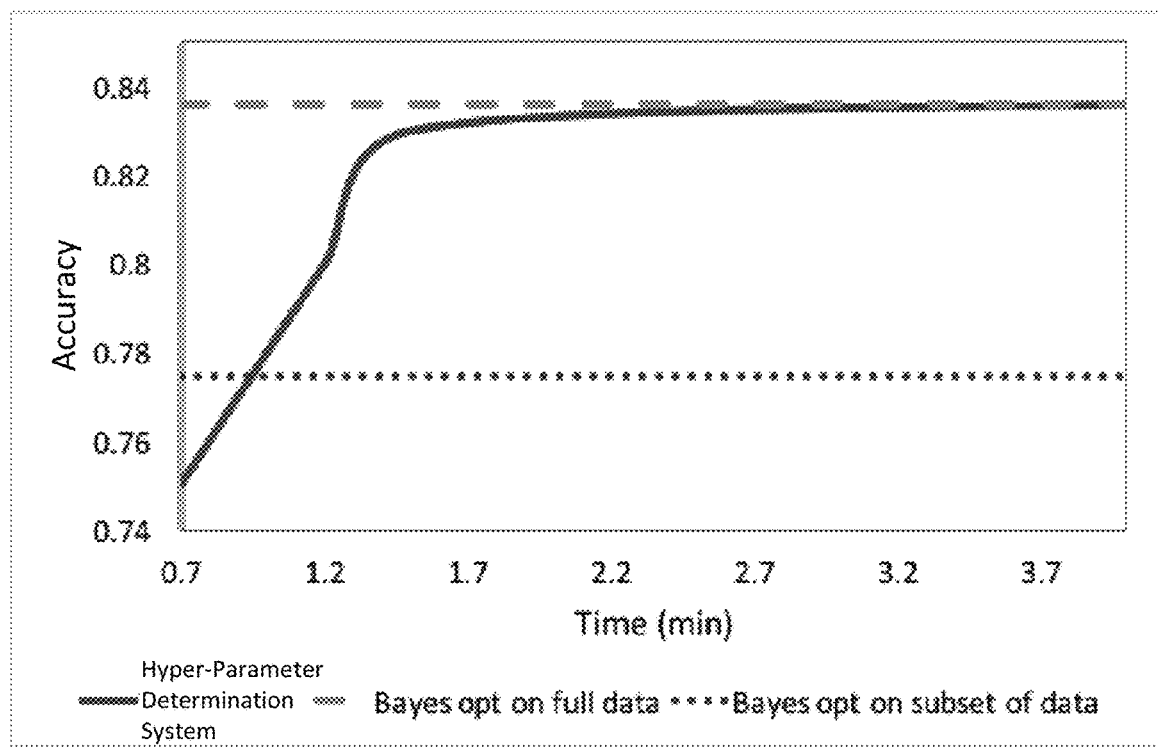
FIGS. 9A-9B illustrate graphs depicting how changes in an accuracy-efficiency balance metric affect the hyper-parameter determination system in accordance with one or more embodiments.
Figure 9B:
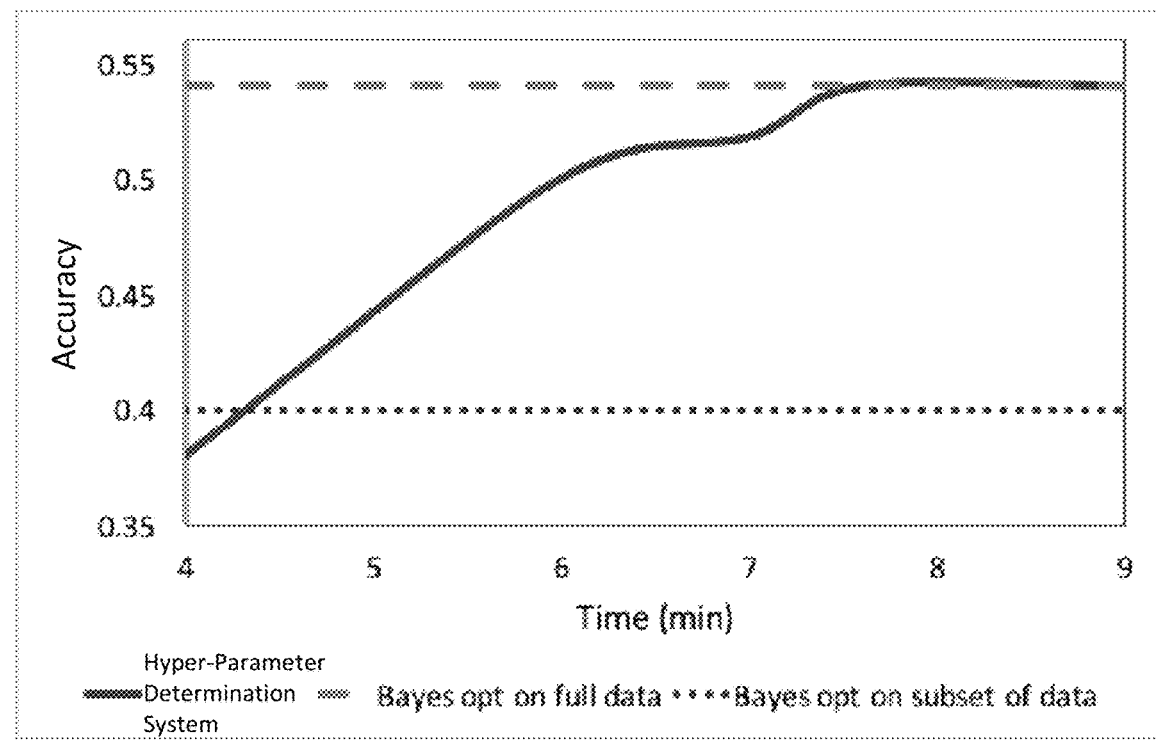

Indeed, experimenters have shown that the hyper-parameter determination system 102 can flexibly adjust to accommodate different accuracies and training efficiencies based on variations in the accuracy-training efficiency balance metric. FIGS. 9A-9B illustrate example graphs depicting the flexibility and the efficiency of the hyper-parameter determination system 102 with regard to accuracy metrics and training efficiency metrics in accordance with one or more embodiments.

As illustrated in FIG. 9A, experimenters tested the hyper-parameter determination system 102 against standard Bayesian optimization over a full data set and standard Bayesian optimization over a subset of a data set with respect to training a support vector machine. Particularly, the experimenters utilized a dataset of online reviews and ratings from the *Yelp Academic Challenge Dataset*, http://www.yelp.com/dataset_challenge. Each review contains a star rating from 1 to 5 stars, and the task is to predict the rating based on the textual information from the corresponding review. The experimenters demonstrated the efficiency and the flexibility of the hyper-parameter determination system 102 based on adjusting the accuracy-training efficiency balance metric $\alpha \in \{0.1, 0.3, 0.5, 0.7, 0.9\}$.

The graph in FIG. 9A illustrates the accuracy of the standard Bayes optimization model over a full dataset (represented by the dashed line) given infinite training time, along with the accuracy of the standard Bayes optimization model trained over a subset of data (represented by the dotted line). In addition, the graph of FIG. 9A illustrates the flexibility of the hyper-parameter determination system 102, where smaller values for a correspond to higher accuracies and longer training times, and where larger values for a correspond to lower accuracies and shorter training times.

As illustrated in FIG. 9B, experimenters tested the hyper-parameter determination system 102 against standard Bayesian optimization over a full data set and standard Bayesian optimization over a subset of a data set with respect to training a deep neural network. The experimenters utilized a dataset of insurance information. The experimenters demonstrated the efficiency and the flexibility of the hyper-parameter determination system 102 based on adjusting the accuracy-training efficiency balance metric $\alpha \in \{0.1, 0.3, 0.5, 0.7, 0.9\}$.

Like the graph in FIG. 9A, the graph in FIG. 9B illustrates the accuracy of the standard Bayes optimization model over a full dataset (represented by the dashed line) given infinite training time, along with the accuracy of the standard Bayes optimization model trained over a subset of data (represented by the dotted line). In addition, the graph of FIG. 9B illustrates the flexibility of the hyper-parameter determination system 102, where smaller values for a correspond to higher accuracies and longer training times, and where larger values for a correspond to lower accuracies and shorter training times.

Thus, as shown in FIGS. 9A-9B, the hyper-parameter determination system 102 can flexibly control the accuracy relative to the training efficiency. Indeed, by utilizing the hyper-parameter determination system 102 implementing devices can reduce computer resources while controlling for threshold accuracy levels in the resulting machine learning model. For example, by modifying accuracy-training efficiency balance metrics, the hyper-parameter determination system 102 can flexibly select hyper-parameters that will achieve a desired balance between accuracy and efficiency.

In addition to the graphs of FIGS. 9A-9B, the tables illustrated in FIGS. 10A-10B provide numerical support for the efficiency and the flexibility of the hyper-parameter determination system 102. Together the tables of FIGS. 10A and 10B show improvements of the hyper-parameter determination system 102 in accordance with one or more embodiments.

As shown in FIG. 10A, for example, the table indicates the accuracy of the hyper-parameter determination system 102 along with the accuracies of the standard Bayesian optimization models for both the insurance dataset and the ratings/reviews dataset. As shown in FIG. 10B, the corresponding training efficiencies of the hyper-parameter determination system 102 and the standard Bayesian optimization models are shown. Thus, for the insurance dataset, the tables show that the hyper-parameter determination system 102 achieves an upper-baseline accuracy in 6.7 minutes, while the standard Bayesian optimization over the full dataset requires 12 minutes to do the same. For the insurance data, the hyper-parameter determination system 102 provides 94% of the upper-baseline accuracy in under 55% of the training time. For the review data, the hyper-parameter determination system 102 provides 96% of the upper-baseline accuracy in under 57% of the training time.

Figure 11:
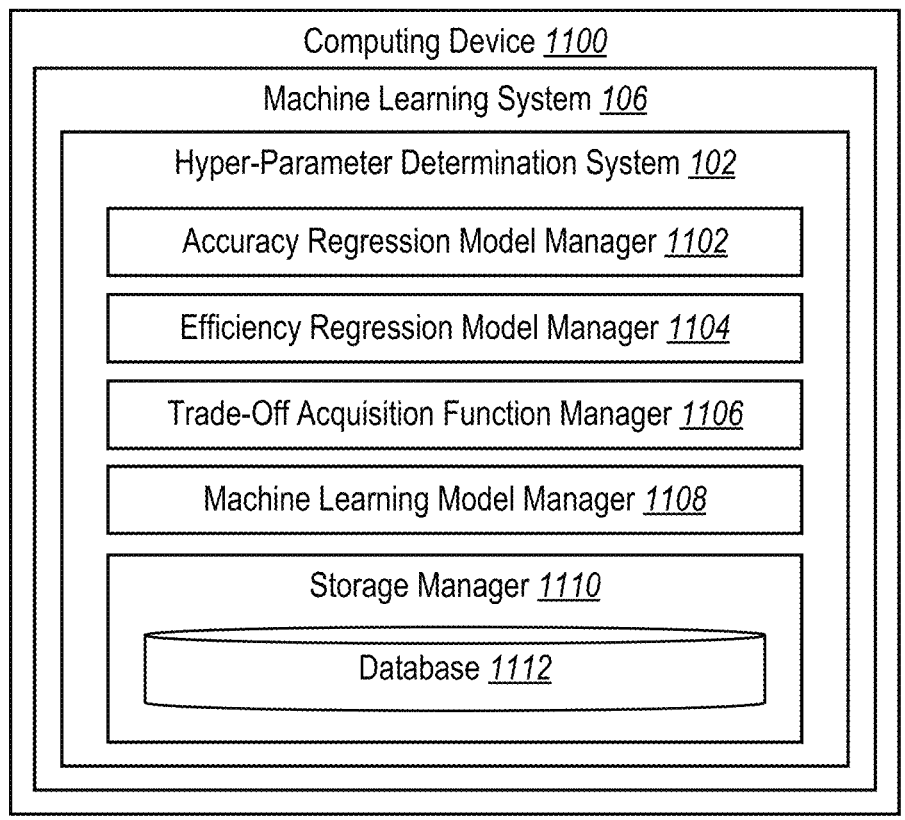
FIG. 11 illustrates a schematic diagram of a hyper-parameter determination system in accordance with one or more embodiments.

Looking now to FIG. 11, additional detail will be provided regarding components and capabilities of the hyper-parameter determination system 102. Specifically, FIG. 11 illustrates an example schematic diagram of the hyper-parameter determination system 102 on an example computing device 1100 (e.g., one or more of the client device 108 and/or the server(s) 104). As shown in FIG. 11, the hyper-parameter determination system 102 may include an accuracy regression model manager 1102, an efficiency regression model manager 1104, a trade-off acquisition function manager 1106, a machine learning model manager 1108, and a storage manager 1110 (that includes a database 1112). The storage manager 1110 can operate in conjunction with one or more memory devices that store various data such as a machine learning architecture including a plurality of tunable parameters, observed hyper-parameter sets, observed accuracy metrics based on utilizing the observed hyper-parameter sets with the machine learning model, and observed training efficiency metrics based on utilizing the observed hyper-parameter sets with the machine learning model.

As just mentioned, the hyper-parameter determination system 102 includes an accuracy regression model manager 1102. In particular, the accuracy regression model manager 1102 manages, maintains, accesses, utilizes, identifies, determines, fits, and/or generates an accuracy regression model. For example, the accuracy regression model manager 1102 observes or determines accuracy metrics associated with a machine learning model and fits an accuracy regression model to data pairs that include observed hyper-parameter sets and associated observed accuracy metrics.

In addition, the hyper-parameter determination system 102 includes an efficiency regression model manager 1104. In particular, the efficiency regression model manager 1104 manages, maintains, accesses, utilizes, identifies, determines, fits, and/or generates an efficiency regression model. For example, the efficiency regression model manager 1104 observes or determines training efficiency metrics associated with a machine learning model and fits an efficiency regression model to data pairs that include observed hyper-parameter sets and associated observed training efficiency metrics.

As shown, the hyper-parameter determination system 102 further includes a trade-off acquisition function manager 1106. In particular, the trade-off acquisition function manager 1106 manages, maintains, accesses, implements, utilizes, determines, generates, applies, and/or identifies a trade-off acquisition function. For example, the trade-off acquisition function manager 1106 applies a trade-off acquisition function to weight an accuracy regression model and an efficiency regression model in accordance with an accuracy-training efficiency balance metric. Indeed, the trade-off acquisition function manager 1106 determines, receives, or identifies an accuracy-training efficiency balance metric to use as part of the trade-off acquisition function. By utilizing a trade-off acquisition function, the trade-off acquisition function manager 1106 further generates, determines, selects, or identifies a hyper-parameter set.

The hyper-parameter determination system 102 further includes a machine learning model manager 1108. In particular, the machine learning model manager 1108 manages, maintains, accesses, stores, trains, implements, applies, observes, and/or analyzes a machine learning model. For example, the machine learning model manager 1108 trains a machine learning model utilizing a generated hyper-parameter set (e.g., received from the trade-off acquisition function manager 1106). In addition, the machine learning model manager 1108 monitors the machine learning model to determine accuracy metrics and training efficiency metrics associated with the machine learning model and the hyper-parameter set. The machine learning model manager 1108 further communicates with the other components of the hyper-parameter determination system 102 to generate new, updated, or modified hyper-parameter sets based on accuracy metrics and training efficiency metrics.

The components of the hyper-parameter determination system 102 can include software, hardware, or both. For example, the components of the hyper-parameter determination system 102 can include one or more instructions stored on a computer-readable storage medium and executable by processors of one or more computing devices (e.g., the computing device 1100). When executed by the one or more processors, the computer-executable instructions of the hyper-parameter determination system 102 can cause the computing device 1100 to perform the methods described herein. Alternatively, the components of the hyper-parameter determination system 102 can comprise hardware, such as a special purpose processing device to perform a certain function or group of functions. Additionally or alternatively, the components of the hyper-parameter determination system 102 can include a combination of computer-executable instructions and hardware.

Furthermore, the components of the hyper-parameter determination system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the hyper-parameter determination system 102 may be implemented as part of a stand-alone application on a personal computing device or a mobile device. Alternatively or additionally, the components of the hyper-parameter determination system 102 may be implemented in any application that allows creation and delivery of marketing content to users, including, but not limited to, applications in ADOBE EXPERIENCE MANAGER, ADOBE DOCUMENT CLOUD, and ADOBE CREATIVE CLOUD, such as ADOBE SENSEI. "ADOBE," "ADOBE EXPERIENCE MANAGER," "ADOBE DOCUMENT CLOUD," "ADOBE CREATIVE CLOUD," and "ADOBE SENSEI," are trademarks of Adobe Inc. in the United States and/or other countries.

FIGS. 1-11, the corresponding text, and the examples provide a number of different systems, methods, and non-transitory computer readable media for generating hyper-parameter sets by implementing a trade-off acquisition function to balance between accuracy and training efficiency. In addition to the foregoing, embodiments can also be described in terms of flowcharts comprising acts for accomplishing a particular result. For example, FIG. 12 illustrates a flowchart of an example sequence or series of acts in accordance with one or more embodiments.

Figure 12:
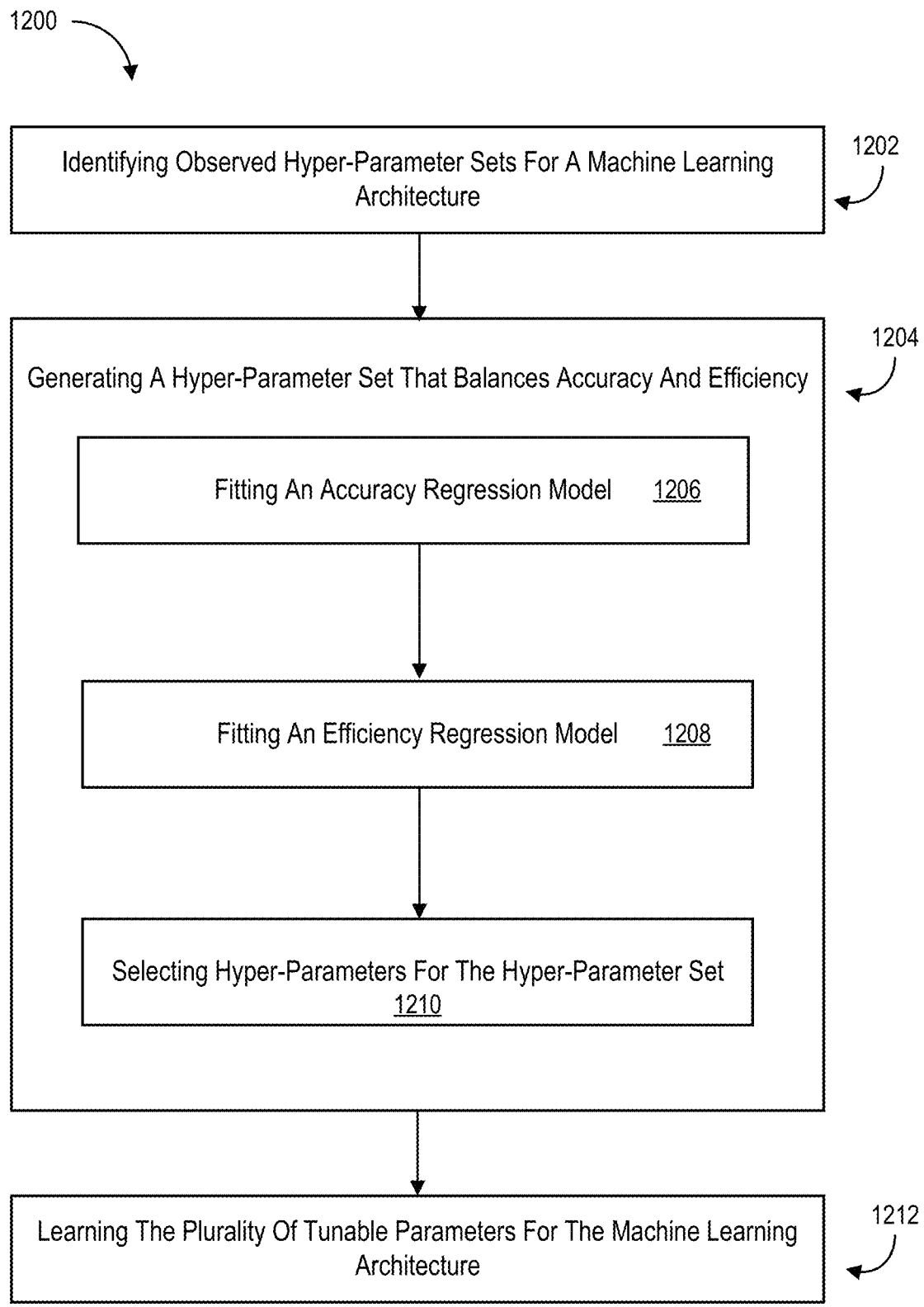
FIG. 12 illustrates a flowchart of a series of acts for generating hyper-parameter sets by implementing a trade-off acquisition function to balance between accuracy and training efficiency in accordance with one or more embodiments.

While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 for generating hyper-parameter sets by implementing a trade-off acquisition function to balance between accuracy and training efficiency. In particular, the series of acts 1200 includes an act 1202 of identifying observed hyper-parameter sets for a machine learning architecture. In particular, the act 1202 can involve identifying observed hyper-parameter sets for a machine learning architecture including a plurality of tunable parameters.

The series of acts 1200 can also include an act 1204 of generating a hyper-parameter set that balances accuracy and efficiency. In particular, the act 1204 can involve generating a hyper-parameter set that balances accuracy and efficiency of learning the tunable parameters. In some embodiments, the act 1204 includes additional acts such as the acts 1206-1210.

Indeed, the act 1206 can include fitting an accuracy regression model. For example, the act 1206 can involve fitting an accuracy regression model to pairs of the observed hyper-parameter sets and associated accuracy metrics. The act 1206 can involve determining probability distributions of accuracy metrics corresponding to hyper-parameter sets conditioned by the observed hyper-parameter sets and the associated accuracy metrics. In some embodiments, the series of acts 1200 includes an act of determining observed accuracy metrics associated with the observed hyper-parameter sets In addition, the act 1204 includes an act 1208 of fitting an efficiency regression model. In particular, the act 1208 can involve fitting an efficiency regression model to pairs of the observed hyper-parameter sets and associated training efficiency metrics. The act 1208 can involve determining probability distributions of training efficiency metrics corresponding to hyper-parameter sets conditioned by the observed hyper-parameter sets and the associated training efficiency metrics. In some embodiments, the series of acts 1200 includes an act of determining observed efficiency metrics associated with the observed hyper-parameter sets.

Further, the act 1204 includes an act 1210 of selecting hyper-parameters for the hyper-parameter set. In particular, the act 1210 can involve selecting hyper-parameters for the hyper-parameter set utilizing a weighted combination of the accuracy regression model and the efficiency regression model. For example, the act 1210 can involve selecting the hyper-parameters for the hyper-parameter set by further utilizing a trade-off acquisition function to weight an accuracy acquisition function associated with the accuracy regression model relative to an efficiency acquisition function associated with the efficiency regression model utilizing an accuracy-training efficiency balance metric. Indeed, the act 1210 can involve utilizing the trade-off acquisition function to select hyper-parameters by weighting (or combining) an accuracy acquisition function associated with the accuracy regression model relative to an efficiency acquisition function associated with the efficiency regression model utilizing an accuracy-training efficiency balance metric.

The hyper-parameter set can include a training set size and one or more of a dropout rate, a regularization parameter, a hidden unit, a batch size, a number of epochs, a bias, or a cost parameter for the machine learning architecture. In some embodiments, the hyper-parameter set includes one or more of a training set size, a dropout rate, a regularization parameter, a hidden unit, a batch size, a number of epochs, a bias, or a cost parameter for the machine learning architecture. In other embodiments, the hyper-parameter set includes a training set size. The machine learning model can include one of a support vector machine or a neural network.

The series of acts 1200 can include an act 1212 of learning the plurality of tunable parameters of the machine learning architecture utilizing the hyper-parameter set. Indeed, the series of acts 1200 can include an act of utilizing the hyper-parameter set to train the machine learning model and determine new accuracy metrics and new training efficiency metrics associated with the hyper-parameter set. Additionally, the series of acts 1200 can include an act of selecting a modified hyper-parameter set based on the new accuracy metrics and the new training efficiency metrics. Selecting the modified hyper-parameter set can involve modifying the accuracy regression model to fit to the new accuracy metrics and modifying the efficiency regression model to fit the new training efficiency metrics. Selecting the modified hyper-parameter set can also involve utilizing a (modified) trade-off acquisition function to weight the modified accuracy regression model relative to the modified efficiency regression model utilizing the accuracy-training efficiency balance metric.

In addition, the series of acts 1200 can include an act of determining new accuracy metrics and new training efficiency metrics associated with the hyper-parameter set based on performance of the trained machine learning model. Further, the series of acts 1200 can include an act of fitting a modified accuracy regression model and a modified efficiency regression model based on the new accuracy metrics and the new training efficiency metrics. Further still the series of acts 1200 can include an act of generating a new hyper-parameter set utilizing a modified trade-off acquisition function that is based on a combination of the modified accuracy regression model and the modified efficiency regression model.

In some embodiments, the series of acts 1200 includes an act of determine the trade-off acquisition function. In particular, determining the trade-off acquisition function can involve determining an accuracy acquisition function utilizing the accuracy regression model. Determining the trade-off acquisition function can also involve determining an efficiency acquisition function utilizing the efficiency regression model. Determining the trade-off acquisition function can further involve combining the accuracy acquisition function and the efficiency acquisition function utilizing the accuracy-training efficiency balance metric.

The series of acts 1200 can also include an act of identifying an additional accuracy-training efficiency balance metric as well as an act of generating an additional hyper-parameter set utilizing the trade-off acquisition function that weights the accuracy regression model and the efficiency regression model utilizing the additional accuracy-training efficiency balance metric. The series of acts 1200 can further include utilizing the additional hyper-parameter set to train the machine learning model and determine additional accuracy metrics and additional training efficiency metrics associated with the additional hyper-parameter set as well as an act of comparing the additional accuracy metrics and the additional training efficiency metrics with the new accuracy metrics and the new training efficiency metrics. In addition, the series of acts 1200 can include an act of determining new accuracy metrics and new training efficiency metrics associated with the hyper-parameter set based on performance of the trained machine learning model.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
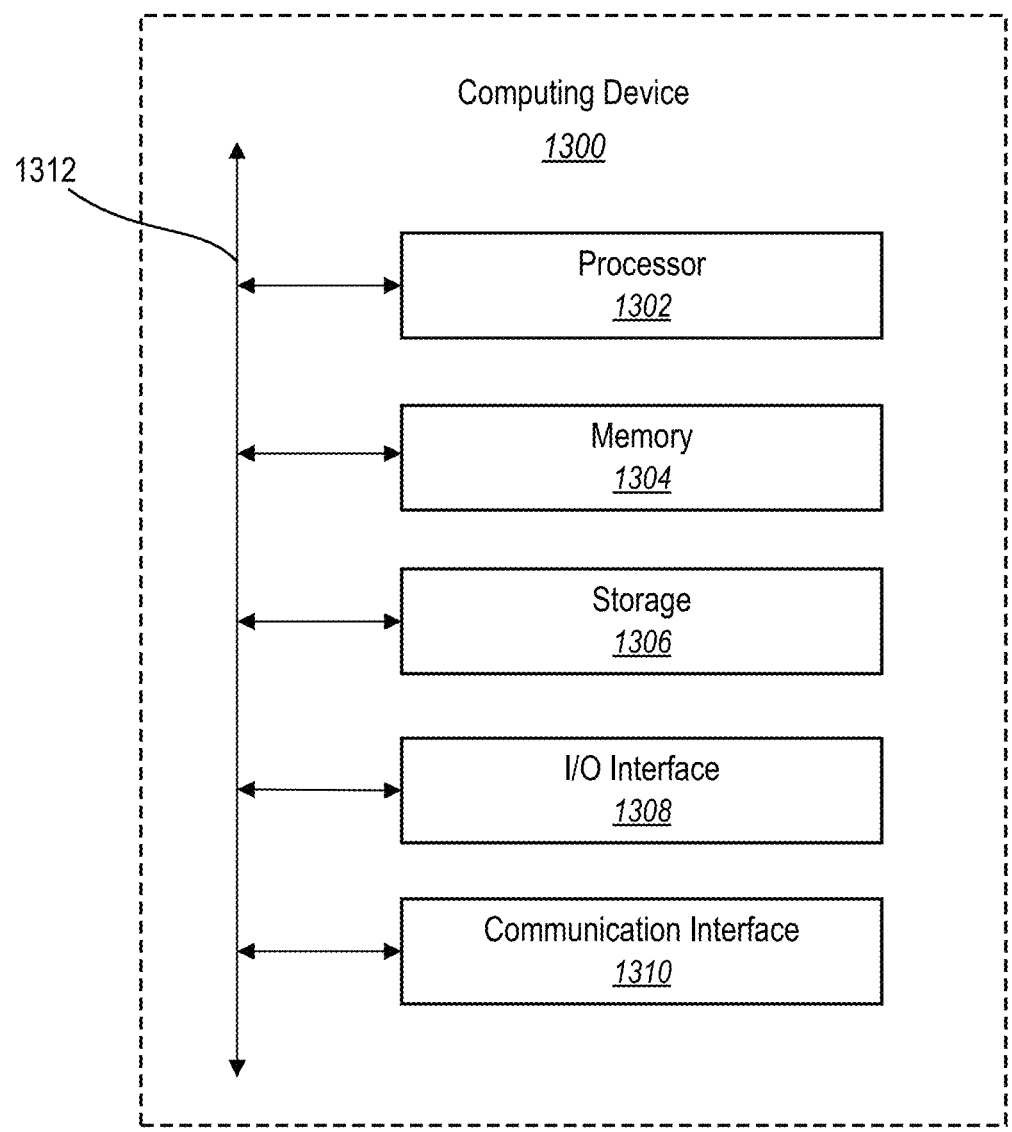
FIG. 13 illustrates a block diagram of an example computing device in accordance with one or more embodiments.

FIG. 13 illustrates, in block diagram form, an example computing device 1300 (e.g., the computing device 1100, the client device 108, and/or the server(s) 104) that may be configured to perform one or more of the processes described above. One will appreciate that the hyper-parameter determination system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   identify observed hyper-parameter sets for a machine learning architecture comprising a plurality of tunable parameters;
   generate a hyper-parameter set that balances accuracy and efficiency of learning the tunable parameters by:
   fitting an accuracy regression model to pairs of the observed hyper-parameter sets and associated accuracy metrics;
   fitting an efficiency regression model to pairs of the observed hyper-parameter sets and associated training efficiency metrics; and
   selecting hyper-parameters for the hyper-parameter set utilizing a weighted combination of the accuracy regression model and the efficiency regression model; and
   learn the plurality of tunable parameters of the machine learning architecture utilizing the hyper-parameter set.

2. The non-transitory computer readable medium of claim 1, further comprising instructions that, when executed by the at least one processor, cause the computing device to select the hyper-parameters for the hyper-parameter set by further utilizing a trade-off acquisition function to weight an accuracy acquisition function associated with the accuracy regression model relative to an efficiency acquisition function associated with the efficiency regression model utilizing an accuracy-training efficiency balance metric.

3. The non-transitory computer readable medium of claim 1, further comprising instructions that, when executed by the at least one processor, cause the computing device to:
   determine new accuracy metrics and new training efficiency metrics associated with the hyper-parameter set based on performance of the machine learning architecture.

4. The non-transitory computer readable medium of claim 3, further comprising instructions that, when executed by the at least one processor, cause the computing device to fit a modified accuracy regression model and a modified efficiency regression model based on the new accuracy metrics and the new training efficiency metrics.

5. The non-transitory computer readable medium of claim 4, further comprising instructions that, when executed by the at least one processor, cause the computing device to generate a new hyper-parameter set utilizing a modified trade-off acquisition function that is based on a combination of the modified accuracy regression model and the modified efficiency regression model.

6. The non-transitory computer readable medium of claim 1, further comprising instructions that, when executed by the at least one processor, cause the computing device to fit the accuracy regression model to pairs of the observed hyper-parameter sets and associated accuracy metrics by determining probability distributions of accuracy metrics corresponding to hyper-parameter sets conditioned by the observed hyper-parameter sets and the associated accuracy metrics.

7. The non-transitory computer readable medium of claim 1, further comprising instructions that, when executed by the at least one processor, cause the computing device to fit the efficiency regression model to pairs of the observed hyper-parameter sets and associated training efficiency metrics by determining probability distributions of training efficiency metrics corresponding to hyper-parameter sets conditioned by the observed hyper-parameter sets and the associated training efficiency metrics.

8. The non-transitory computer readable medium of claim 1, wherein the hyper-parameter set comprises a training set size and one or more of a dropout rate, a regularization parameter, a hidden unit, a batch size, a number of epochs, a bias, or a cost parameter for a machine learning architecture.

9. A system comprising:
   one or more memory devices comprising a machine learning architecture comprising a plurality of tunable parameters, observed hyper-parameter sets, observed accuracy metrics, and observed training efficiency metrics; and
   one or more computing devices that are configured to cause the system to:
   generate a hyper-parameter set that balances accuracy and efficiency of learning the tunable parameters by:
   fitting an accuracy regression model to pairs of the observed hyper-parameter sets and associated observed accuracy metrics;
   fitting an efficiency regression model to pairs of the observed hyper-parameter sets and associated observed training efficiency metrics; and
   selecting hyper-parameters for the hyper-parameter set by combining the accuracy regression model and the efficiency regression model utilizing an accuracy-training efficiency balance metric;

learn the plurality of tunable parameters of the machine learning architecture utilizing the hyper-parameter set to determine new accuracy metrics and new training efficiency metrics associated with the hyper-parameter set; and select a modified hyper-parameter set based on the new accuracy metrics and the new training efficiency metrics.

10. The system of claim 9, wherein the one or more computing devices are further configured to cause the system to select the modified hyper-parameter set by:

modifying the accuracy regression model to fit to the new accuracy metrics; and modifying the efficiency regression model to fit the new training efficiency metrics.

11. The system of claim 10, wherein the one or more computing devices are further configured to cause the system to select the modified hyper-parameter set by utilizing a trade-off acquisition function to weight the modified accuracy regression model relative to the modified efficiency regression model utilizing the accuracy-training efficiency balance metric.

12. The system of claim 11, wherein the one or more computing devices are further configured to cause the system to determine the trade-off acquisition function by:

determining an accuracy acquisition function utilizing the accuracy regression model;

determining an efficiency acquisition function utilizing the efficiency regression model; and combining the accuracy acquisition function and the efficiency acquisition function utilizing the accuracy-training efficiency balance metric.

13. The system of claim 9, wherein the one or more computing devices are further configured to cause the system to:

identify an additional accuracy-training efficiency balance metric; and generate an additional hyper-parameter set utilizing by combining the accuracy regression model and the efficiency regression model utilizing the additional accuracy-training efficiency balance metric.

14. The system of claim 13, wherein the one or more computing devices are configured to cause the system to:

modify the plurality of tunable parameters of the machine learning architecture to determine additional accuracy metrics and additional training efficiency metrics associated with the additional hyper-parameter set; and compare the additional accuracy metrics and the additional training efficiency metrics with the new accuracy metrics and the new training efficiency metrics.

15. The system of claim 9, wherein the hyper-parameter set comprises one or more of a training set size, a dropout rate, a regularization parameter, a hidden unit, a batch size, a number of epochs, a bias, or a cost parameter for the machine learning architecture.

16. A computer-implemented method for selecting hyper-parameters for training parametrized machine learning models, the computer-implemented method comprising:

identifying observed hyper-parameter sets for a machine learning architecture comprising a plurality of tunable parameters;

generating a hyper-parameter set that balances accuracy and efficiency of learning the tunable parameters by:

fitting an accuracy regression model to pairs of the observed hyper-parameter sets and associated accuracy metrics;

fitting an efficiency regression model to pairs of the observed hyper-parameter sets and associated training efficiency metrics; and selecting hyper-parameters for the hyper-parameter set utilizing a weighted combination of the accuracy regression model and the efficiency regression model; and learning the tunable parameters of the machine learning architecture utilizing the hyper-parameter set.

17. The computer-implement method of claim 16, wherein the machine learning architecture is part of one of a support vector machine or a neural network.

18. The computer-implemented method of claim 16, further comprising determining observed accuracy metrics and observed training efficiency metrics associated with the observed hyper-parameter sets.

19. The computer-implemented method of claim 18, further comprising determining new accuracy metrics and new training efficiency metrics associated with the hyper-parameter set based on performance of the machine learning architecture.

20. The computer-implemented method of claim 16, wherein the hyper-parameter set comprises a training set size.

* * * * *